(12) United States Patent
Chino et al.

(10) Patent No.: US 7,533,978 B2
(45) Date of Patent: May 19, 2009

(54) COLOR COMPOSITION AND INKJET RECORDING METHOD

(75) Inventors: Tomohiro Chino, Minami-Ashigara (JP); Toshiki Fujiwara, Minami-Ashigara (JP); Takashi Ozawa, Fujinomiya (JP); Yoshiharu Yabuki, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 209 days.

(21) Appl. No.: 10/511,318

(22) PCT Filed: Apr. 4, 2003

(86) PCT No.: PCT/JP03/04348

§ 371 (c)(1),
(2), (4) Date: Jun. 22, 2005

(87) PCT Pub. No.: WO03/087238

PCT Pub. Date: Oct. 23, 2003

(65) Prior Publication Data

US 2005/0243151 A1 Nov. 3, 2005

(30) Foreign Application Priority Data

Apr. 16, 2002 (JP) ............................. 2002-113460
Sep. 26, 2002 (JP) ............................. 2002-281723

(51) Int. Cl.
*G01D 11/00* (2006.01)

(52) U.S. Cl. ..................... 347/100; 347/95; 106/31.27

(58) Field of Classification Search ............... 347/100, 347/95, 96, 101; 106/31.6, 31.27, 31.13; 523/160
See application file for complete search history.

(56) References Cited

U.S. PATENT DOCUMENTS

| 4,480,019 | A | 10/1984 | Higashiguchi |
| 5,370,954 | A | 12/1994 | Ohta |
| 6,500,247 | B1 * | 12/2002 | Lehmann et al. ......... 106/31.51 |
| 7,211,133 | B2 * | 5/2007 | Taguchi .................. 106/31.48 |
| 2002/0170126 | A1 * | 11/2002 | Mikoshiba et al. ....... 106/31.48 |
| 2004/0089198 | A1 * | 5/2004 | Millard et al. ............. 347/100 |
| 2004/0112251 | A1 | 6/2004 | Foster et al. |

FOREIGN PATENT DOCUMENTS

| EP | 1 229 083 | 8/2002 |
| JP | 03 200882 | 11/1991 |
| JP | 06-088034 | 3/1994 |
| JP | 2002-265809 | 9/2002 |
| JP | 2002-275380 | 9/2002 |
| JP | 2002-302619 | 10/2002 |
| JP | 2002-309115 | 10/2002 |
| JP | 2002-309116 | 10/2002 |
| JP | 2002-327131 | 11/2002 |
| JP | 2003-371214 | 12/2002 |
| JP | 2003-049100 | 2/2003 |
| JP | 2003-064275 | 3/2003 |
| JP | 2003-306623 | 10/2003 |
| JP | 2004-533495 | 11/2004 |
| JP | 2004-533496 | 11/2004 |
| WO | 00 20513 | 4/2000 |
| WO | 00 46309 | 8/2000 |
| WO | 01 19925 | 3/2001 |
| WO | 02 072708 | 9/2002 |
| WO | 02 072715 | 9/2002 |
| WO | 02 074865 | 9/2002 |
| WO | 02 083795 | 10/2002 |

OTHER PUBLICATIONS

Notification of Reason for Refusal, Japanese Patent Application No. 2002-113460, dated Apr. 30, 2008, with English Translation.
Notification of Reason for Refusal, Japanese Patent Application No. 2002-281723, dated Apr. 30, 2008, with English Translation.

* cited by examiner

*Primary Examiner*—Manish S Shah
(74) *Attorney, Agent, or Firm*—Buchanan Ingersoll & Rooney PC

(57) ABSTRACT

A coloring composition containing a dis-azo compound or poly-azo compound which contains two or more substituents having a pKa value in water of –i0 to 5 and which has an oxidation potential more positive than 0.8 V (vs SCE), and an inkjet recording ink composition containing the coloring composition and an inkjet recording method wherein an image is formed on an image-receiving material containing a support having provided thereon an ink receiving layer containing a white inorganic pigment particle, using the inkjet recording ink composition.

15 Claims, No Drawings

COLOR COMPOSITION AND INKJET RECORDING METHOD

TECHNICAL FIELD

The present invention relates to a coloring composition such as an ink composition containing an azo compound having specific physical properties, an inkjet recording ink composition, and an inkjet recording method.

BACKGROUND ART

In recent years, the mainstream of image-recording materials has been materials for forming color images in particular. More specifically, recording materials based on inkjet recording, recording materials based on heat-sensitive image transfer, recording materials based on electronic photography, silver halide photosensitive materials based on transfer, printing inks, recording pens, and the like have been widely utilized. Moreover, in image pickup devices such as CCD in picture-taking instruments and in LCD and PDP as displays, color filters are employed for recording and reproducing color images.

In these color image recording materials and color filters, coloring matter (dyes or pigments) of three primary colors for so-called additive color mixing or subtractive color mixing are employed for reproducing or recording full-color images. However, there actually exists no coloring matter which has absorption properties capable of realizing a preferable color reproduction range and which is fast enough to endure various use conditions and environmental conditions, so that improvement is strongly desired.

Because of inexpensive material costs, capability of high-speed recording, reduced noise in recording operations, and ease in color recording, inkjet recording has rapidly come into wide use and is still making further progress.

Inkjet recording methods include a continuous method in which liquid droplets are jetted continuously and a on-demand method in which liquid droplets are jetted depending on signals of image information, and ejection methods thereof include a method in which liquid droplets, pressed by a piezoelectric element, are ejected, a method in which liquid droplets are ejected by bubbles generated in the ink by heat, a method in which ultrasonic waves are used, and a method in which liquid droplets are suction-ejected by electrostatic force.

Moreover, as an inkjet recording ink composition, aqueous ink, oil-based ink, and solid (fusion-type) ink are used.

The properties required for the coloring matter in such an inkjet recording ink composition are satisfactory solubility or dispersibility in a solvent, capability of high-density recording, excellent hue, fastness to light, heat, and active gases (oxidizing gases such as $NO_x$ and ozone, $SO_x$, etc.) in the environment, excellent fastness to water and chemicals, excellent fixation and little bleeding on image-receiving materials, excellent storability as ink, freedom from toxicity, high purity, and availability at a low cost.

However, it is extremely difficult to obtain coloring matter that highly satisfies these requirements. In particular, there is a strong demand for coloring matter that has a satisfactory hue and exhibits fastness to light, humidity, and heat, and particularly, when printing is carried out on an image-receiving material having an ink-receiving layer containing porous white inorganic pigment particles, it is strongly desired that the coloring matter exhibits fastness to oxidizing gases such as ozone in the environment.

Heretofore, as a coupling component for azo dyes, phenol, naphthol, aniline, and the like have been widely used. As azo dyes obtainable from these coupling components, dyes disclosed in EP0761771, Japanese Patent No. 2716541, and so forth are known, for example, but these dyes have a problem of inferior lightfastness.

Moreover, any dyes known in the conventional art exhibit extremely insufficient fastness to oxidizing gases such as ozone.

The present inventors have investigated to develop a dye exhibiting fastness to oxidizing gases such as ozone and have conceived to use a nitrogen-containing heterocyclic compound as the coupling component departing from the conventional coupling components such as phenol, naphthol, and aniline. Heretofore, azo dyes using pyridine or pyrazine as the coupling component have been described, for example, in German Patent No. 2743097. However, the use of these dyes for inkjet recording ink was not known at that time. This is because these dyes are all oil-soluble and it is difficult to synthesize water-soluble counterparts of these dyes. Therefore, it was impossible to synthesize water-soluble counterparts of these dyes and to employ ink containing such dyes for image formation such as inkjet recording.

The invention aims at solving the above problem in the conventional art and achieving the following object.

Namely, it is an object of the invention to provide:

(1) various coloring compositions such as a printing ink composition (e.g., inkjet recording ink) which afford colored images and colored materials excellent in water resistance and fastness using a novel azo compound having an excellent water resistance and a sufficient fastness to light, heat, humidity, and active gases in the environment as a black dye, and (2) an inkjet recording ink composition and an inkjet recording method capable of forming images having an excellent water resistance and a high fastness to light and active gases in the environment, particularly ozone gas.

DISCLOSURE OF THE INVENTION

As a result of precise investigation for aiming at a dye having an excellent water resistance and a high fastness to light and ozone, the inventors have found that an azo compound having a specific oxidation potential exhibits an unexpectedly high fastness, and therefore accomplished the invention.

According to the invention, a coloring composition having the following constitution, an inkjet recording ink composition, and an inkjet recording method are provided, and thereby the above object of the invention is achieved.

(1) A coloring composition comprising a dis-azo compound or poly-azo compound which contains two or more substituents having a pKa value in water of −10 to 5 and which has an oxidation potential more positive than 0.8 V (vs SCE).

(2) The coloring composition described in the above (1), wherein the dis-azo compound or poly-azo compound is an azo compound represented by the following general formula (I):

wherein A, B, and C each independently represents an aromatic group which may be substituted or a heterocyclic group which may be substituted, A and C are monovalent groups and B is a divalent group.

(3) The coloring composition described in the above (1), wherein the dis-azo compound or poly-azo compound is an azo compound represented by the following general formula (II):

wherein A and B are the same as A and B in the general formula (I) respectively, and Het represents an aromatic heterocyclic group.

(4) The coloring composition described in the above (3), wherein at least one of A and B in the general formula (II) is an aromatic heterocyclic group.

(5) The coloring composition described in the above (3), wherein Het in the general formula (II) is an aromatic nitrogen-containing six-membered heterocyclic group.

(6) The coloring composition described in the above (3), wherein the dis-azo compound or poly-azo compound is an azo compound represented by the following general formula (III):

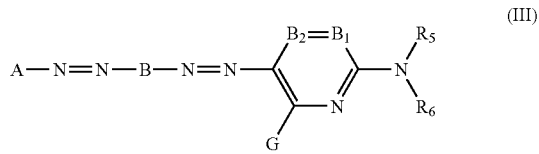

wherein A and B are the same as A and B in the general formula (II) respectively, $B_1$ and $B_2$ represent $=CR_1-$ and $-CR_2=$ respectively, or either one represents a nitrogen atom and the other represents $=CR_1-$ or $-CR_2=$; G, $R_1$ and $R_2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an anilino group and a heterocyclic amino group), an acylamino group, a ureido group, a sulfamoylamino group, an alkoxycarbonylamino group, an aryloxycarbonylamino group, an alkyl- or arylsulfonylamino group, a heterocyclic sulfonylamino group, a nitro group, an alkyl- or arylthio group, a heterocyclic thio group, an alkyl- or arylsulfonyl group, a heterocyclic sulfonyl group, an alkyl- or arylsulfinyl group, a heterocyclic sulfinyl group, a sulfamoyl group, or a sulfo group, and each of these groups may further be substituted; $R_5$ and $R_6$ each independently represents a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group, or a sulfamoyl group, and each of these groups may further be substituted, provided that $R_5$ and $R_6$ are not hydrogen atoms at the same time; and $R_1$ and $R_5$ or $R_5$ and $R_6$ may be combined to form a five-membered or six-membered ring.

(7) The coloring composition described in the above (6), wherein the dis-azo compound or poly-azo compound is an azo compound represented by the following general formula (IV):

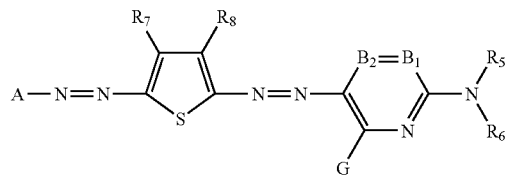

wherein A, $B_1$, $B_2$, G, $R_5$ and $R_6$ are the same as A, $B_1$, $B_2$, G, $R_5$ and $R_6$ in the general formula (III) respectively, and $R_7$ and $R_8$ are the same as $R_1$ in the general formula (III).

(8) An inkjet recording ink composition, which comprises the coloring composition described in any one of the above (1) to (7).

(9) An inkjet recording method, wherein an image is formed on an image-receiving material comprising a support having provided thereon an ink receiving layer containing a white inorganic pigment particle, using the inkjet recording ink composition described in the above (8).

(10) A method for improving ozone gas-fastness of an image formed on an image-receiving material comprising a support having provided thereon an ink receiving layer containing a white inorganic pigment particle using an inkjet recording ink composition, wherein the inkjet recording ink composition is the inkjet recording ink composition described in the above (8).

BEST MODE FOR CARRYING OUT THE INVENTION

The following will explain the present invention in detail.

The requirements for the azo compound to be contained in the coloring composition of the invention are to have an oxidation potential more positive than 0.8 V (vs SCE) and to contain two or more substituents having a pKa value in water of −10 to 5.

A more positive oxidation potential is more preferred, and the oxidation potential is preferably more positive than 1.0 V (vs SCE), more preferably more positive than 1.1 V, and further preferably more positive than 1.2 V (vs SCE).

The above requirements of the invention are based on the findings, which are shown by the inventors in their study on ozone gas-fastness of colored images, that there is a correlation between the oxidation potential of a compound for use in the colored images and ozone gas-fastness and the use of a compound having an oxidation potential value more positive than 0.8 V against saturated calomel electrode (SCE) improves ozone gas-fastness and that an unexpectedly high ozone gas-fastness is observed when the azo compound is an azo compound containing two or more substituents whose pKa value in water is from −10 to 5.

The reason for the improvement of ozone gas-fastness of colored images is as follows. It is considered that a colored compound is decomposed through oxidation owing to the relationship between HOMO (highest occupied molecular orbital) and LUMO (lowest unoccupied molecular orbital) of the compound and ozone gas, i.e., by the reaction between HOMO of the azo compound and LUMO of ozone gas, and thereby density of the colored images is lowered. For this reason, it is presumed that the use of an azo compound having a specific oxidation potential results in decreased HOMO of the compound to lower its reactivity with ozone gas, and hence ozone gas-fastness thereof is enhanced.

In this regard, the value of the oxidation potential stands for easiness of the movement of an electron from a sample to an electrode. Thus, it means that the larger the value (the more positive the oxidation potential), the more difficult the movement of the electron from the sample to the electrode is, in other words, the more difficult the oxidization is. With regard to the relationship with the structure of a compound, the oxidation potential becomes more positive when an electron-withdrawing group is introduced and the oxidation potential becomes more negative when an electron-donating group is introduced.

The value of the oxidation potential will be precisely described below but the value means electric potential at which an electron of a compound is taken out at an anode in voltammetry of the compound, and is considered to coincide approximately with the energy level of HOMO in the ground state of the compound.

Measurement of the oxidation potential will be specifically explained. The oxidation potential is determined by dissolving a test sample in a concentration of $1\times10^{-4}$ to $1\times10^{-6}$ mol·dm$^{-3}$ in a solvent such as dimethylformamide or acetonitrile containing a supporting electrolyte such as sodium perchlorate or tetrapropylammonium perchlorate and measuring a value against SCE (saturated calomel electrode) using cyclic voltammetry or direct current polarography.

Moreover, the supporting electrolyte and solvent to be used may be suitably selected depending on the oxidation potential and solubility of the test sample. Usable supporting electrolytes and solvents are described in, for example, Delahay, *New Instrumental Methods in Electrochemistry*, (1954) by Interscience Publishers; A. J. Bard, et al., *Electrochemical Methods*, (1980), by John Wiley & Sons; and Akira Fujishima, et al., *Denkikagaku Sokuteiho* (Electrochemical Measurement Methods), pp. 101-118, (1984), by Gihodo Shuppan.

The value of the oxidation potential may deviate by about several tens millivolts by influences such as a liquid potential and a liquid resistance of the sample solution, but it is possible to guarantee the reproducibility of the potential by calibration with a standard sample (e.g., hydroquinone).

As the oxidation potential in the invention, a value obtained by dissolving a compound in a concentration of $1\times10^{-3}$ mol·dm$^{-3}$ in a mixed solution of water/N,N-dimethylformamide=2/98 containing 0.1 mol·dm$^{-3}$ of tetrapropylammonium perchlorate as a supporting electrolyte and measuring a potential by direct current polarography using SCE (saturated calomel electrode) as a reference electrode, a graphite electrode as a working electrode and a platinum electrode as a counter electrode is adopted.

Moreover, the methods for making the oxidation potential positive in the invention include a method of selecting a compound whose structure itself has a positive potential, a method of introducing an electron-withdrawing group at any position, i.e., a method of introducing a substituent having a large value of the Hammett's substituent constant, σp value as a measure of the electron-withdrawing group or electron-donating group, and the like. The method of selecting a dye structure originally having a positive oxidation potential is preferable not only in view of ozone gas-fastness but also in view of molecular design since an electron-withdrawing group or electron-donating group can be arbitrarily introduced in order to control other fastness, hue, and physical properties.

Furthermore, in the method of introducing an electron-withdrawing group at any position of the structure of a compound to make the oxidation potential more positive for the purpose of lowering reactivity with ozone as an electrophile, the oxidation potential can be made more positive by introducing a substituent having a large σp value when the Hammett's substituent constant, σp value as a measure of the electron-withdrawing group or electron-donating group is adopted.

The Hammett's substituent constant, σp value will be described. The Hammett's rule is an empirical rule advocated by L. P. Hammett in 1953 in order to quantitatively discuss the influence of substituents on the reaction or equilibrium of benzene derivatives, and propriety of this rule is now widely recognized. The substituent constant required for the Hammett's rule includes a σp value and a cm value. These values can be found in many general books. For example, the details are given in J. A. Dean ed., Lange's Handbook of Chemistry, 12th Ed. (1979), by McGraw-Hill; and a special issue of Kagaku no Ryoiki (Regions of Chemistry), No. 122, pp. 96-103 (1979), by Nankodo. Needless to say, while in the invention, each substituent will be limited or described in terms of the Hammett's substituent constant σp value, this does not mean that the invention is limited only to substituents having known values that can be found from the foregoing general books, but the invention also includes substituents, values of which are unknown but will fall within the intended scope when measured according to the Hammett's rule. Furthermore, though compounds that are not a benzene derivative are included within the scope of the general formulae (I) and (II) of the invention, the σp values are used as a measure to exhibit the electronic effect of the substituent irrespective of the substitution position. In the invention, the σp value is used in such meanings.

In addition, as mentioned above, the requirement for the azo compound to be contained in the coloring composition of the invention is to contain two or more substituents having a pKa value in water of −10 to 5. The pKa value is preferably from −9 to 5, and more preferably from −8 to 5.

The substituent having a pKa value in water of −10 to 5 is a substituent which represents a moiety of the proton-dissociating group of a compound whose pKa value in water is from −10 to 5.

The pKa value is a value represented in accordance with the definition described in Yasuhiko Sawaki, *Kiso Kagaku kosu* (Basic Chemistry Course) *Butsuri Yuki Kagaku* (Physical Organic Chemistry), pp. 47-60 (1999), by Maruzen. The pKa values of various compounds are given in Table 8.1 of M. B. Smith and J. March, *March's Advanced Organic Chemistry*, 5th edition, p. 329 (2001), by John Wiley & Sons, and literatures cited therein. From the values, the pKa value of a substituent may be deduced. The pKa value of compounds not described therein can be determined from the definition of pKa value in accordance with the measuring method described in the Chemical Society of Japan ed., *Jikken Kagaku Koza* (Lecture on Experimental Chemistry) 1, 4th edition, *Kihon Sosa* (Basic Operations) I, p. 115 (1990), by Maruzen. The pKa value of a weak acid can be also determined as a relative value in accordance with the method described in Yasuhiko Sawaki, *Kiso Kagaku kosu* (Basic Chemistry Course) *Butsuri Yuki Kagaku* (Physical Organic Chemistry), p. 50 (1999), by Maruzen. Alternatively, since the pKa value varies depending on environmental conditions such as solvent, the value can be also determined in accordance with the method described in the Chemical Society of Japan ed., *Jikken Kagaku Koza* (Lecture on Experimental Chemistry) 9, 4th edition, *Denki/Jiki* (Electricity/Magnetism), p. 286 (1991), by Maruzen.

However, since the pKa value of a certain substituent in a compound is greatly influenced by the structure of the compound, the actual value is sometimes different from the value estimated from the other compound. Though it is possible to measure actually the pKa value of the dissociating group in the compound in accordance with the aforementioned methods, it is not easy to understand the value systematically owing to identification of the resulting values and possible influence of the measurement on the moiety other than the dissociating group.

Therefore, in the invention, the pKa value of a certain substituent is not represented by a measured value in the compound but is represented by a general pKa value of the corresponding functional group.

In this case, it is preferable to carry out estimation by using a value capable of minimizing influence of substituent effect and steric effect, i.e., the pKa value of the dissociating group on a compound having a structure wherein the structure near to the dissociating group is similar. For example, the pKa value of the carboxyl group bonded to a benzene ring present in a certain compound A can be expressed by the pKa value (4.2) of benzoic acid or the pKa value of a benzoic acid derivative wherein substituent(s) and position of substitution are similar to those of the benzene ring in the compound A.

In the invention, the pKa value used for defining the range of physical properties of a compound is a pKa value in water.

Specific examples of the substituent having a pKa value in water of −10 to 5 include a sulfo group, a carboxyl group, a thiocarboxyl group, a sulfino group, a phosphono group, a dihydroxyphosphino group, and the like. Preferred are a sulfo group and a carboxyl group.

Incidentally, in the invention, the dissociating group is expressed in an undissociated form or a form where a counter ion is present, but an actual compound may be present in a dissociated form or in an undissociated form or in a mixed state thereof in any ratio. Actually, the existing state varies depending on the environment in which the compound is present.

In the invention, the number of the substituents having a pKa value in water of −10 to 5 is two or more, but is preferably three or more, and more preferably four or more.

The substituent having a pKa value in water of −10 to 5 may be present at any position in the compound and the substituting positions of the individual substituents can be independently chosen.

However, based on the description of the factors of directness toward cellulose fibers in Kazuo Kondo ed., *Senshoku* (dyeing), 3rd edition, (1987), by Tokyo Denki University Publishing, the substituents may be desirably present not in adjacent positions but at appropriate intervals in the case that they are water-soluble groups.

The substituents whose pKa value in water is from −10 to 5 and which are present in an amount of two or more in the compound are preferably present at least one per each of the two or more rings, and more preferably two or more per each ring. For example, in the case of the compound represented by the general formula (I) which is a preferable azo compound in the invention as described in detail below, preferred is the case that there exist two rings on which at least one such substituent is present, and more preferred is the case that there exist two rings on which two or more such substituents are present.

The reason why colored images obtained by using a coloring composition of the invention containing a specific azo compound are excellent in ozone gas resistance is considered to be that, in addition to the above presumption, the presence of appropriate number of suitable dissociating groups at appropriate positions in the molecule improves directness of the azo compound and thereby the azo compound in the ink can be fixed at a desirable position in the image-receiving material and is strongly mordanted in an image-receiving material or an image-receiving layer. This is consistent with the results of water resistance test in Examples which will be detailed below.

Namely, if the azo compound is strongly mordanted in an image-receiving material or an image-receiving layer and hence colored images having a satisfactory water resistance is provided, the strength of dyeing can be estimated by a water resistance test. As a matter of fact, in Examples of the invention which will be detailed below, those having a satisfactory ozone gas resistance also have satisfactory water resistance, so that it is realized that mordanting is relevant to ozone gas resistance.

Each group of A, B, and C in the general formula (I) represents an aromatic group such as an aryl group or a heterocyclic group, but C is preferably an aromatic heterocyclic group (Het). At lest one of A and B is also preferably an aromatic heterocyclic group, and in particular, at least B is preferably an aromatic heterocyclic group. The above heterocyclic group is a five-membered to seven-membered ring and preferably contains N, S, and/or O as heteroatom(s). A fused one is also included.

In the general formulae (I) and (II), in the case that B is a heterocyclic group, preferable heterocylces include a thiophene ring, a thiazole ring, an imidazole ring, a benzothiazole ring, a thienothiazole ring, and the like. Of these, preferred are a thiophene ring, a thiazole ring, an imidazole ring, a benzothiazole ring, and a thienothiazole ring represented by the following general formulae (a) to (e). In this regard, most preferably, B is a heterocyclic group derived from thiophene ring represented by the general formula (a).

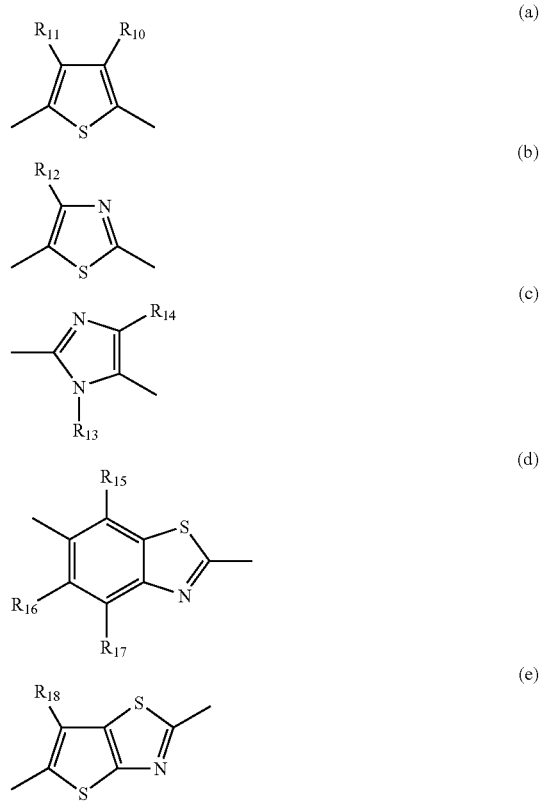

In the above general formulae (a) to (e), $R_{10}$ to $R_{18}$ represent substituents having the same meanings as $R_1$ in the general formula (III).

B may further have substituent(s) and examples of the substituents include a halogen atom, an alkyl group (including a cycloalkyl group and a bicycloalkyl group), an alkenyl group (including a cycloalkenyl group and a bicycloalkenyl group), an alkynyl group, an aryl group, a heterocyclic group, a cyano group, a hydroxyl group, a nitro group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, a sulfo group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imido group, a phosphino group, a phosphono group, a phosphinyl group, a phosphinyloxy group, a phosphinylamino group, and a silyl group.

Among the above functional group, those having a hydrogen atom may be substituted with the above group while removing the hydrogen atom. Examples of such substituents include an alkylcarbonylaminosulfonyl group, an arylcarbonylaminosulfonyl group, an alkylsulfonylaminocarbonyl group, an arylsulfonylaminocarbonyl group, and the like.

A fused ring of a hydrocarbon ring or a heterocycle may be formed by combining the substituents on these heterocycles each other, and substituent(s) may be present on the fused ring. In the case of a nitrogen-containing heterocycle, the nitrogen atom may be converted into quaternary one. Moreover, with regard to the heterocycle capable of tautomerization, even when only one tautomer is described, the compound also includes the other tautomer(s).

Moreover, Het represents an aromatic heterocyclic group, preferably an aromatic nitrogen-containing heterocyclic group, especially a five-membered or six-membered aromatic nitrogen-containing heterocyclic group, and more preferably an aromatic nitrogen-containing heterocyclic group represented by the general formula (V).

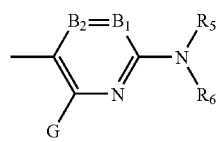

(V)

In the general formula (V), $B_1$ and $B_2$ each represents =$CR_1$— or —$CR_2$=, or either one represents a nitrogen atom and the other represents =$CR_1$— or —$CR_2$=. More preferably, each represents =$CR_1$— or —$CR_2$=.

$R_5$ and $R_6$ each independently represents a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group, or a sulfamoyl group, and each of these groups may further be substituted. Preferable substituents represented by $R_5$ and $R_6$ include a hydrogen atom, an aliphatic group, an aromatic group, a heterocyclic group, an acyl group, and an alkyl- or arylsulfonyl group. More preferred are a hydrogen atom, an aromatic group, a heterocyclic group, an acyl group, and an alkyl- or arylsulfonyl group. Most preferred are a hydrogen atom, an aryl group, and a heterocyclic group. Each of these groups may further be substituted. However, $R_5$ and $R_6$ are not hydrogen atoms at the same time.

G, $R_1$ and $R_2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an anilino group and a heterocyclic amino group), an acylamino group, a ureido group, a sulfamoylamino group, an alkoxycarbonylamino group, an aryloxycarbonylamino group, an alkyl- or arylsulfonylamino group, a heterocyclic sulfonylamino group, a nitro group, an alkyl- or arylthio group, a heterocyclic thio group, an alkyl- or arylsulfonyl group, a heterocyclic sulfonyl group, an alkyl- or arylsulfinyl group, a heterocyclic sulfinyl group, a sulfamoyl group, or a sulfo group, and each of these groups may further be substituted.

The substituent represented by G is preferably a hydrogen atom, a halogen atom, an aliphatic group, an aromatic group, a hydroxyl group, an alkoxy group, an aryloxy group, an acyloxy group, a heterocyclic oxy group, an amino group (including an anilino group and a heterocyclic amino group), an acylamino group, a ureido group, a sulfamoylamino group, an alkoxycarbonylamino group, an aryloxycarbonylamino group, an alkyl- or arylthio group, or a heterocyclic thio group; more preferably a hydrogen atom, a halogen atom, an alkyl group, a hydroxyl group, an alkoxy group, an aryloxy group, an acyloxy group, an amino group (including an anilino group and a heterocyclic amino group), or an acylamino group, and most preferably a hydrogen atom, an anilino group, or an acylamino group. Each of these groups may further be substituted.

Preferred examples of the substituent represented by $R_1$ and $R_2$ include a hydrogen atom, an alkyl group, a halogen atom, an alkoxycarbonyl group, a carboxyl group, a carbamoyl group, a hydroxyl group, an alkoxy group and cyano group. Each of these groups may further be substituted.

$R_1$ and $R_5$ or $R_5$ and $R_6$ may be combined to form a five-membered or six-membered ring.

As the substituent with which each of the substituents represented by A, $R_1$, $R_2$, $R_5$, $R_6$, and G is substituted, the substituents as enumerated above for G, $R_1$, and $R_2$ can be enumerated. Moreover, it is preferable to have further an ionic hydrophilic group as a substituent at any position on A, $R_1$, $R_2$, $R_5$, $R_6$, and G.

The ionic hydrophilic group as a substituent includes a sulfo group, a carboxyl group, a phosphono group, and a quaternary ammonium group, and the like. The ionic hydrophilic group is preferably a carboxyl group, a phosphono group, or a sulfo group, and particularly preferably a carboxyl group or a sulfo group. The carboxyl group, phosphono group, and sulfo group may be in the form of a salt, and examples of a counter ion forming the salt include an ammonium ion, an alkali metal ion (e.g., a lithium ion, a sodium ion, a potassium ion) and an organic cation (e.g., a tetramethylammonium ion, a tetramethylguanidinium ion, a tetramethylphosphonium ion).

In the case that a substituent having a pKa value of −10 to 5 is present on Het, the position is preferably any of $R_4$ to $R_9$, and more preferably any of $R_6$ to $R_9$, and particularly preferably, one substituent is present as $R_6$ or $R_7$ and the other one as $R_8$ or $R_9$.

The substituent having a pKa value of −10 to 5 may be bonded to A or B in the general formula (I) directly or through any divalent connecting group. As the divalent connecting group, there may be enumerated a connecting group which is expressed by the structure obtainable by further removing a hydrogen atom or a substituent from the abovementioned substituent (a monovalent substituent) that B may have. Examples thereof include an alkylene group (e.g., methylene, ethylene, propylene, butylene, or pentylene), an arylene group (e.g., phenylene, naphthylene, or 2,4,6-trimethylphenylene), an alkenylene group (e.g., ethenylene or propenylene), an alkynylene group (e.g., ethynylene or propynylene), an amido group, an ester group, a sulfonamido group, a sulfonate ester group, a ureido group, a sulfonyl group, sulfinyl group, a thioether group, an ether group, a carbonyl group, —N(Rq)- (Rq represents a hydrogen atom, a substituted or unsubstituted alkyl group, or a substituted or unsubstituted aryl group), a heterocyclic divalent group (e.g., benzothiazol-2,6-diyl group, 6-chloro-1,3,5-triazin-2,4-diyl group, pyrimidin-2,4-diyl group, or quinoxalin-2,3-diyl group), or a divalent connecting group constituted by combining two or more of them. Moreover, the divalent connecting group may have any substituent.

The azo group in the azo compound to be contained in the coloring composition of the present invention may be present in an azo form (—N=N—) and a hydrazo form (—NH—N=) depending on the structure of the compound, but all the compounds are expressed as the azo form in the invention.

In addition, the azo compound may be present as various tautomers depending on the environment where the compound is present. In the invention, the compound is expressed as only one tautomer but may be present as the other tautomers and these tautomers are also included in the invention.

In the invention, a particularly preferred structure is represented by the following general formula (VI).

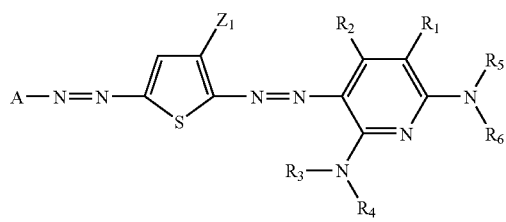

(VI)

In the general formula (VI), $Z_1$ represents an electron-withdrawing group having a Hammett's substituent constant, σp value of 0.20 or more. $Z_1$ represents preferably an electron-withdrawing group having a σp value of 0.30 or more, more preferably an electron-withdrawing group having a σp value of 0.45 or more, and particularly preferably an electron-withdrawing group having a σp value of 0.60 or more, but the value is desirably 1.0 or less. As preferred specific examples of the substituent, electron-withdrawing substituents as described later are enumerated. Especially, an acyl group having 2 to 20 carbon atoms, an alkyloxycarbonyl group having 2 to 20 carbon atoms, a nitro group, a cyano group, an alkylsulfonyl group having 1 to 20 carbon atoms, an arylsulfonyl group having 6 to 20 carbon atoms, a carbamoyl group having 1 to 20 carbon atoms, and a halogenated alkyl group having 1 to 20 carbon atoms are preferred. Of these, a cyano group, an alkylsulfonyl group having 1 to 20 carbon atoms, an arylsulfonyl group having 6 to 20 carbon atoms are particularly preferred, and a cyano group is most preferred.

$R_3$ and $R_4$ in the general formula (VI) are the same as $R_1$ in the general formula (III). Each of the groups explained in the general formula (VI) may further have a substituent. In the case that each of these groups further has a substituent, the substituent includes the substituents explained in the general formula (I), the groups exemplified as $R_1$, and the ionic hydrophilic groups.

Examples of the electron-withdrawing group having a Hammett's substituent constant, σp value of 0.60 or more, which is represented by $Z_1$, include a cyano group, a nitro group, an alkylsulfonyl group (e.g., a methanesulfonyl group), and an arylsulfonyl group (e.g., a benzenesulfonyl group).

Examples of the electron-withdrawing group having a Hammett's substituent constant, σp value of 0.45 or more include, in addition to the above substituents, an acyl group (e.g., an acetyl group), an alkoxycarbonyl group (e.g., a dodecyloxycarbonyl group), an aryloxycarbonyl group (e.g., a m-chlorophenoxycarbonyl group), an alkylsulfinyl group (e.g., an n-propylsulfinyl group), an arylsulfinyl group (e.g., a phenylsulfinyl group), a sulfamoyl group (e.g., an N-ethylsulfamoyl group or an N,N-dimethylsulfamoyl group), and a halogenated alkyl group (e.g., a trifluoromethyl group).

Examples of the electron-withdrawing group having a Hammett's substituent constant, σp value of 0.30 or more include, in addition to the above substituents, an acyloxy group (e.g., an acetoxy group), a carbamoyl group (e.g., an N-ethylcarbamoyl group and an N,N-dibutylcarbamoyl group), a halogenated alkoxy group (e.g., a trifluoromethyloxy group), a halogenated aryloxy group (e.g., a pentafluorophenyloxy group), a sulfonyloxy group (e.g., a methylsulfonyloxy group), a halogenated alkylthio group (e.g., a difluoromethylthio group), an aryl group substituted with two or more electron-withdrawing groups having a σp value of 0.15 or more (e.g., a 2,4-dinitrophenyl group or a pentachlorophenyl group), and a heterocyclic group (e.g., a 2-benzoxazolyl group, a 2-benzothiazolyl group, or a 1-phenyl-2-benzimidazolyl group).

Specific examples of the electron-withdrawing group having a σp value of 0.20 or more include a halogen atom in addition to the above substituents.

Specific examples of the azo compound contained in the coloring composition of the invention will be given below in the form of free acid, but it should not be construed that the azo compound to be used in the invention is limited thereto. Moreover, the carboxyl group, phosphono group, and sulfo group may be in the form of salt, and examples of a counter ion forming the salt include an ammonium ion, an alkali metal ion (e.g., a lithium ion, a sodium ion, a potassium ion) and an organic cation (e.g., a tetramethylammonium ion, a tetramethylguanidinium ion, a tetramethylphosphonium ion).

All of the following exemplified compounds have an oxidation potential more positive than 0.8 V (vs SCE).

TABLE 1
A—N=N—B—N=N—C
| | A | B | C |
|---|---|---|---|
| (a-1) | 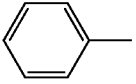 | 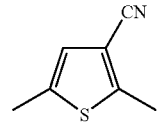 | 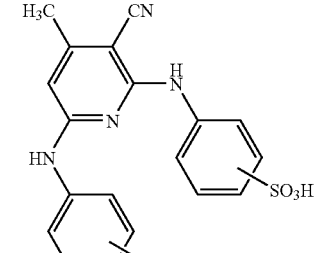 |
| (a-2) | 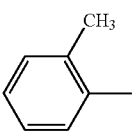 | 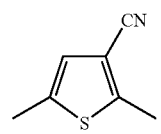 | 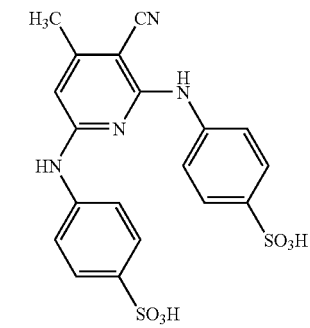 |
| (a-3) | 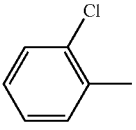 | 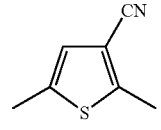 | 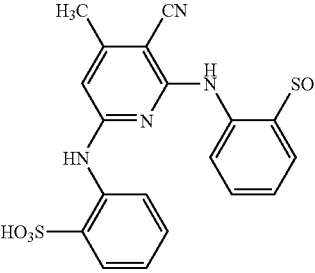 |
| (a-4) | 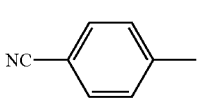 | 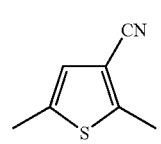 | 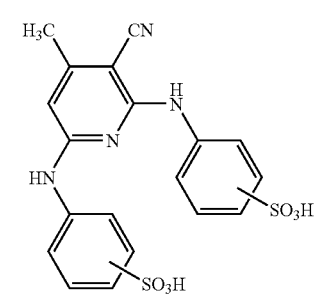 |
| (a-5) | 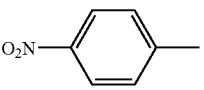 | 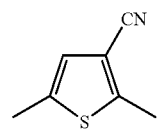 | 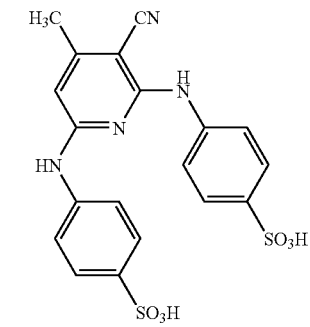 |

TABLE 1-continued
A—N=N—B—N=N—C
| | A | B | C |
|---|---|---|---|
| (a-6) | 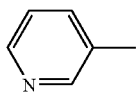 | 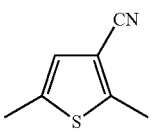 | 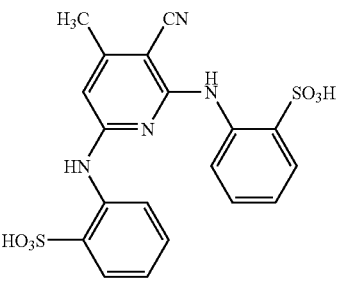 |
| (b-1) | 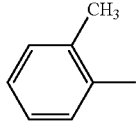 | 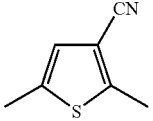 | 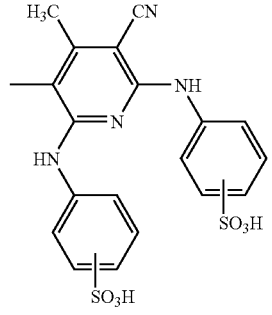 |
| (b-2) | 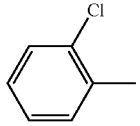 | 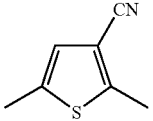 | 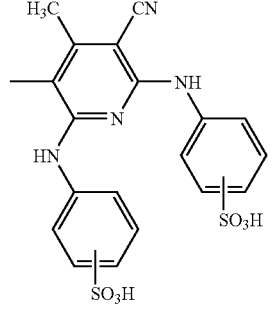 |
| (b-3) | 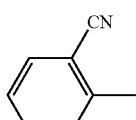 | 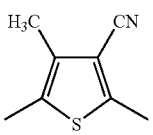 | 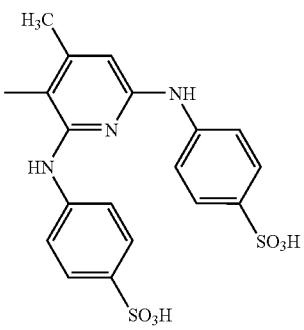 |

TABLE 1-continued
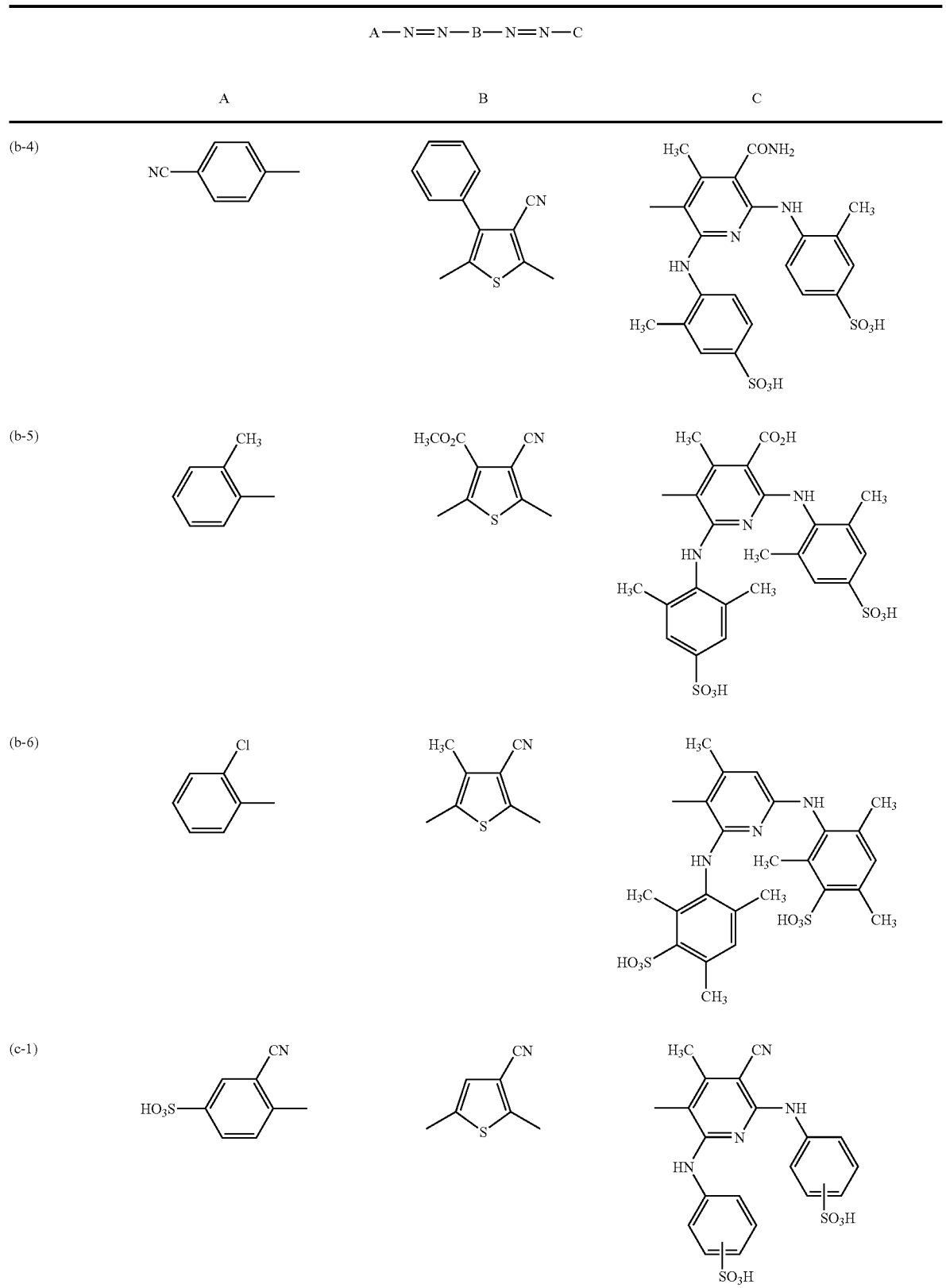

TABLE 1-continued
$$A—N{=}N—B—N{=}N—C$$
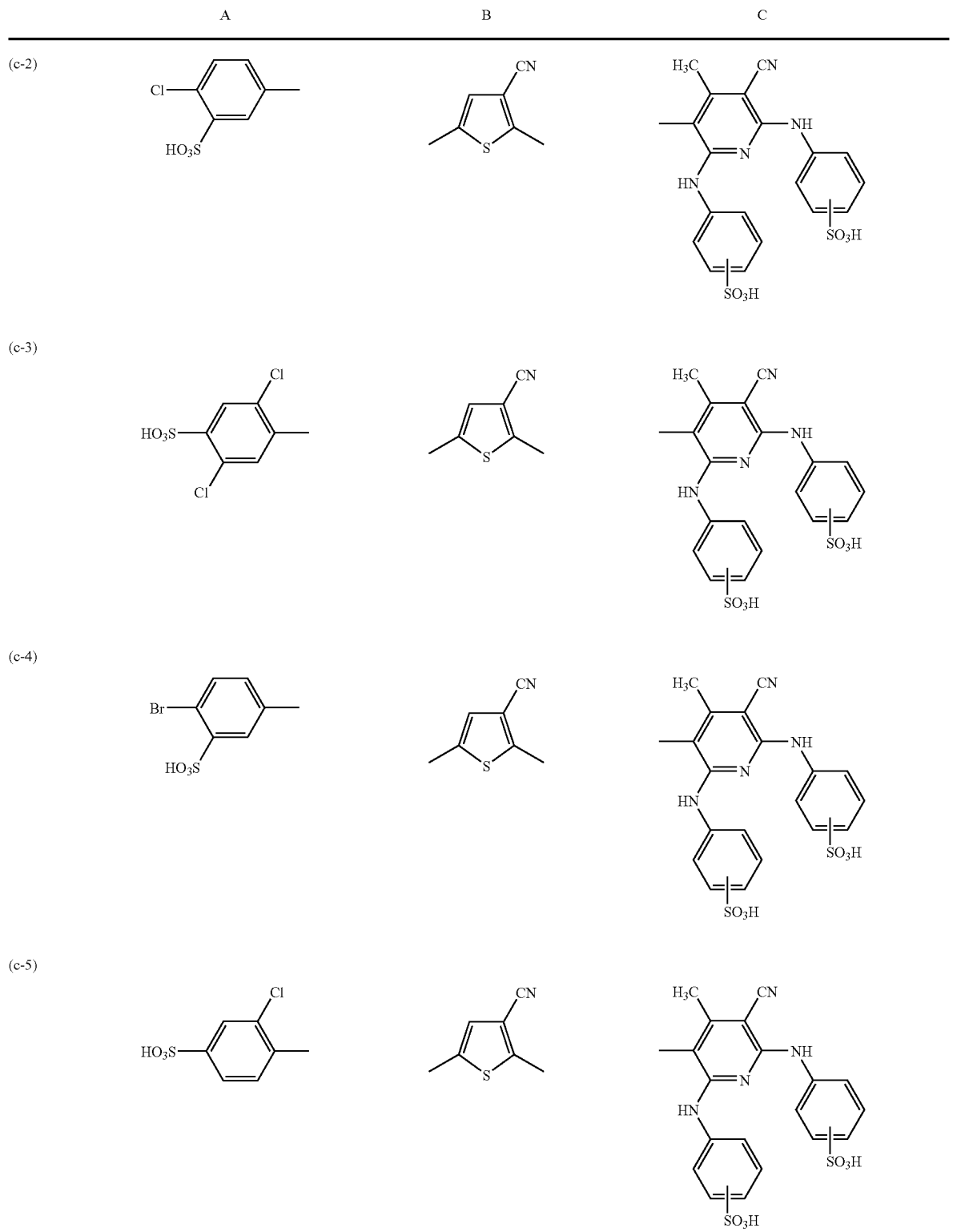

TABLE 1-continued
A—N=N—B—N=N—C
| | A | B | C |
|---|---|---|---|
| (c-6) | 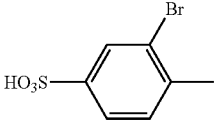 | 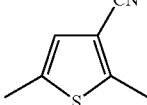 | 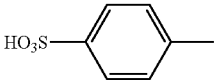 |
| (c-7) | 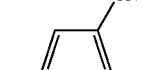 | 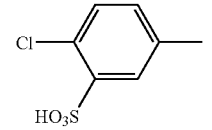 | 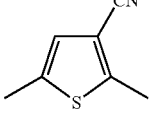 |
| (d-1) | 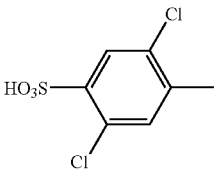 | | |
| (d-2) | 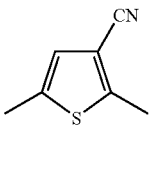 | | |

TABLE 1-continued $$A-N=N-B-N=N-C$$

| | A | B | C |
|---|---|---|---|
| (d-3) | 2-bromo-5-methylbenzenesulfonic acid | 2,5-dimethyl-3-cyanothiophene | pyridine with CN, CH3, methyl substituents and two NH-phenyl-SO3H groups |
| (d-4) | 3-chloro-4-methylbenzenesulfonic acid | 2,5-dimethyl-3-cyanothiophene | pyridine with CN, CH3, methyl substituents and two NH-(methylphenyl)-SO3H groups |
| (d-5) | 3-bromo-4-methylbenzenesulfonic acid | 2,5-dimethyl-3-cyanothiophene | pyridine with CN, CH3, methyl substituents and two NH-phenyl-SO3H groups |
| (d-6) | 4-cyano-3-methylbenzenesulfonic acid | 2,5-dimethyl-3-cyanothiophene | pyridine with CN, CH3, methyl substituents and two NH-(dimethylphenyl)-SO3H groups |

TABLE 1-continued $$A-N=N-B-N=N-C$$

| | A | B | C |
|---|---|---|---|
| (e-1) | 5-methylbenzene-1,3-disulfonic acid (HO₃S, HO₃S substituents) | 2,5-dimethylthiophene-3-carbonitrile | 4-methyl-3-methyl-5-cyano-2,6-bis(phenylamino)pyridine with SO₃H on both anilino rings |
| (e-2) | 5-methylbenzene-1,3-dicarboxylic acid (HO₂C, HO₂C) | 2,5-dimethylthiophene-3-carbonitrile | same pyridine core; one anilino-SO₃H, one plain anilino |
| (e-3) | 3-sulfo-5-carboxytoluene (HO₃S, HO₂C) | 2,5-dimethylthiophene-3-carbonitrile | same pyridine core with two SO₃H-anilino groups |
| (e-4) | 3-phosphono-5-sulfotoluene (H₂O₃P, HO₃S) | 2,5-dimethylthiophene-3-carbonitrile | same pyridine core with two SO₃H-anilino groups |

TABLE 1-continued
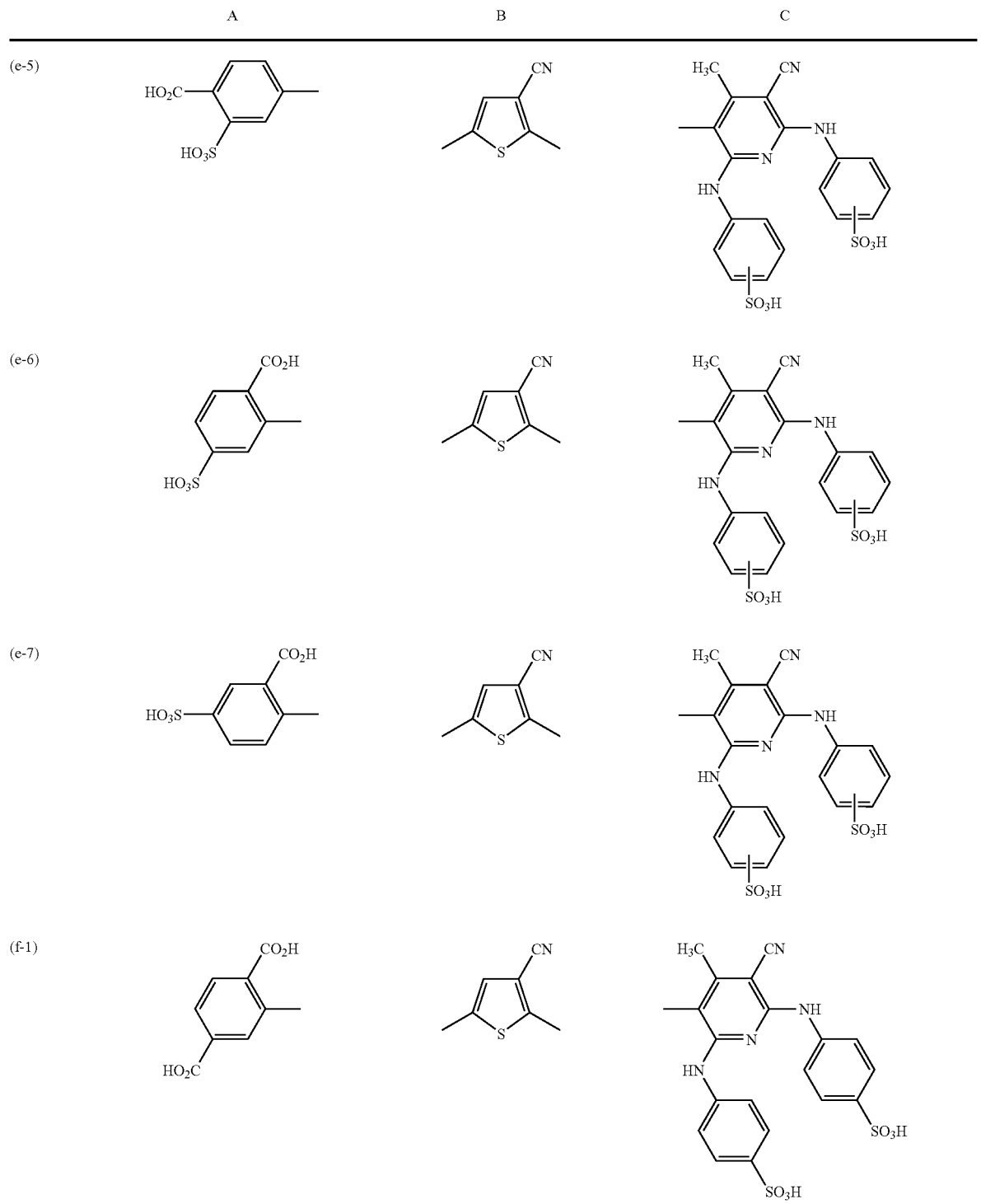

TABLE 1-continued
A—N=N—B—N=N—C
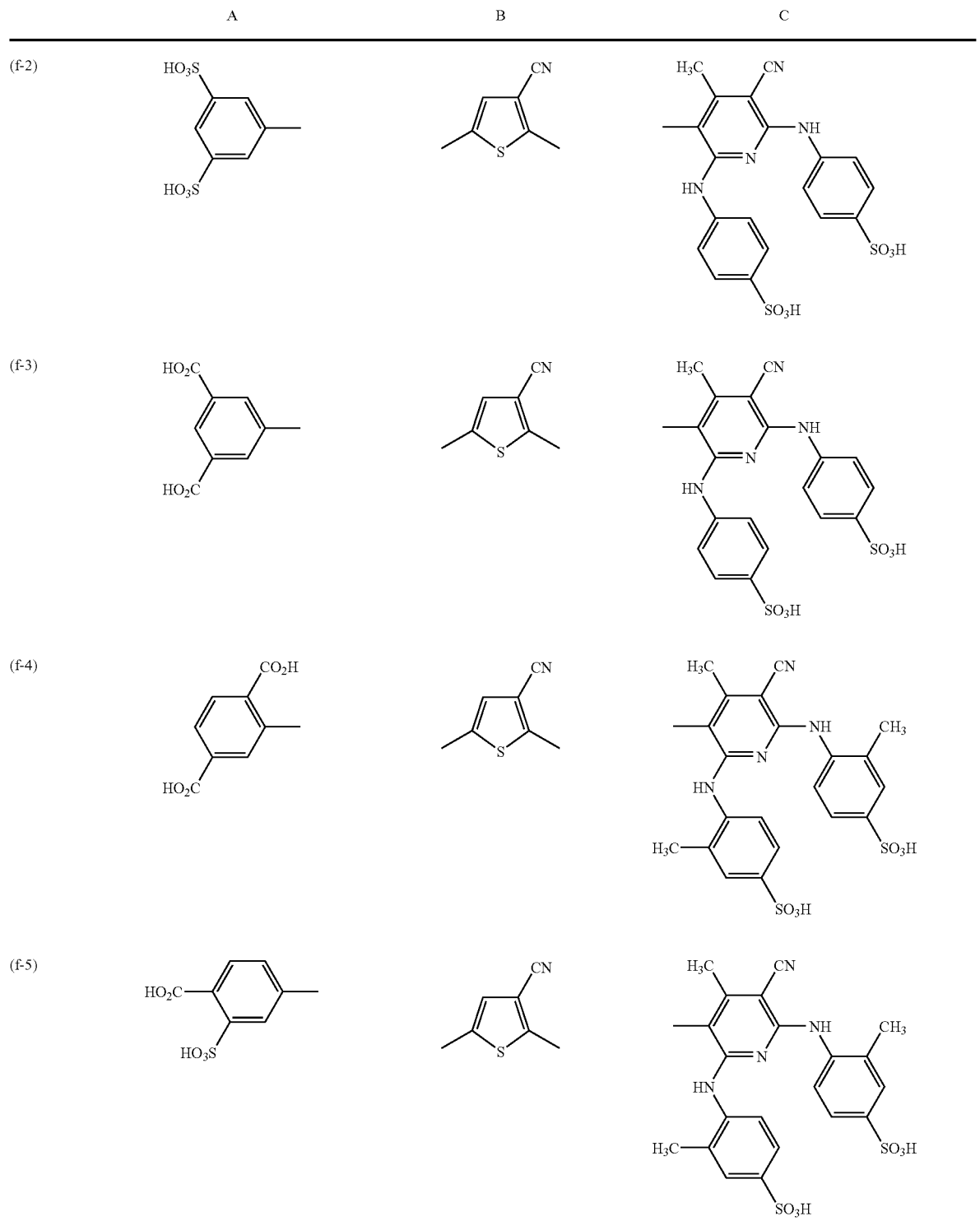

TABLE 1-continued

A—N≡N—B—N≡N—C

| | A | B | C |
|---|---|---|---|
| (f-6) | 3-methyl-5-sulfo-benzoic acid (HO₂C, HO₃S substituents) | 2,5-dimethyl-3-cyano-thiophene | 4-methyl-3-cyano-pyridine with two NH-phenyl-SO₃H groups |
| (f-7) | 3-methyl-5-sulfo-phenylphosphonic acid (H₂O₃P, HO₃S substituents) | 2,5-dimethyl-3-cyano-thiophene | 4-methyl-3-cyano-pyridine with two NH-(2,6-dimethyl-4-sulfo-phenyl) groups |
| (g-1) | 2-methyl-benzenesulfonic acid | 2,5-dimethyl-3-cyano-thiophene | 4-methyl-3-cyano-pyridine with two NH-phenyl-SO₃H groups |
| (g-2) | 5-cyano-2-methyl-benzenesulfonic acid | 2,5-dimethyl-3-cyano-thiophene | 4-methyl-3-cyano-pyridine with two NH-phenyl-SO₃H groups |

TABLE 1-continued $$A-N{=}N-B-N{=}N-C$$

| | A | B | C |
|---|---|---|---|
| (g-3) | 5-chloro-2-methylbenzenesulfonic acid (SO₃H, Cl, CH₃ on benzene) | 2,5-dimethyl-3-cyanothiophene | 4-methyl-5-methyl-3-cyano-2,6-bis(sulfophenylamino)pyridine |
| (g-4) | 5-bromo-2-methylbenzenesulfonic acid | 2,5-dimethyl-3-cyanothiophene | 4-methyl-5-methyl-3-cyano-2,6-bis(sulfophenylamino)pyridine |
| (g-5) | 5-nitro-2-methylbenzenesulfonic acid | 2,5-dimethyl-3-cyanothiophene | 4-methyl-5-methyl-3-cyano-2,6-bis(sulfophenylamino)pyridine |
| (g-6) | 2-methylbenzene-1,4-disulfonic acid | 2,5-dimethyl-3-cyanothiophene | 4-methyl-5-methyl-3-cyano-2,6-bis(sulfophenylamino)pyridine |

TABLE 1-continued

A—N=N—B—N=N—C

| | A | B | C |
|---|---|---|---|
| (h-1) | | | |
| (h-2) | | | |
| (h-3) | | | |
| (h-4) | | | |

TABLE 1-continued $$A-N=N-B-N=N-C$$

| | A | B | C |
|---|---|---|---|
| (h-5) | | | |
| (h-6) | | | |
| (i-1) | | | |
| (i-2) | | | |

TABLE 1-continued

A—N=N—B—N=N—C

| | A | B | C |
|---|---|---|---|
| (i-3) | 7-methylnaphthalene-1,3-disulfonic acid (SO₃H at 1, HO₃S at 3, CH₃ at 7) | 2,5-dimethyl-3-cyanothiophene | 3-cyano-4-methyl-5-methyl-2,6-bis(sulfophenylamino)pyridine |
| (i-4) | naphthalene-1,4,6-trisulfonic acid-7-methyl | 2,5-dimethyl-3-cyanothiophene | 3-cyano-4-methyl-5-methyl-2,6-bis(sulfophenylamino)pyridine |
| (i-5) | 3,8-disulfo-6-methylnaphthalene | 2,5-dimethyl-3-cyanothiophene | 3-cyano-4-methyl-5-methyl-2,6-bis(4-sulfophenylamino)pyridine |
| (i-6) | 1,5-disulfo-7-methylnaphthalene | 2,5-dimethyl-3-cyanothiophene | 3-cyano-4-methyl-5-methyl-2,6-bis(4-sulfophenylamino)pyridine |

TABLE 1-continued $$A-N=N-B-N=N-C$$

| | A | B | C |
|---|---|---|---|
| (i-7) | | | |
| (j-1) | | | |
| (j-2) | | | |
| (j-3) | | | |

TABLE 1-continued $$A-N=N-B-N=N-C$$

| | A | B | C |
|---|---|---|---|
| (j-4) | 7-methylnaphthalene-1,3,5-trisulfonic acid | 2,5-dimethylthiophene-3-carbonitrile | 3-cyano-4,5-dimethyl-2-(4-sulfophenylamino)-6-(4-sulfophenylamino)pyridine |
| (j-5) | 7-methylnaphthalene-1,3-disulfonic acid | 2,5-dimethylthiophene-3-carbonitrile | 3-cyano-4,5-dimethyl-2-(2-methyl-4-sulfophenylamino)-6-(3-methyl-4-sulfophenylamino)pyridine |
| (j-6) | 7-methylnaphthalene-1,5-disulfonic acid | 2,5-dimethylthiophene-3-carbonitrile | 3-cyano-4,5-dimethyl-2-(4-sulfophenylamino)-6-(4-sulfophenylamino)pyridine |
| (j-7) | 7-methylnaphthalene-1,3-disulfonic acid | 2,5-dimethylthiophene-3-carbonitrile | 3-cyano-4,5-dimethyl-2-(2-methyl-4-sulfophenylamino)-6-(3-methyl-4-sulfophenylamino)pyridine |

TABLE 1-continued $$A-N=N-B-N=N-C$$

| | A | B | C |
|---|---|---|---|
| (k-1) | 3-cyano-4-methylbenzenesulfonic acid (HO₃S-phenyl with CN and CH₃) | 3-cyano-2,5-dimethyl-4-methylthiophene | 3-methyl-4-methyl-5-cyano-pyridine with NH-phenyl-SO₃H and NH-phenyl-SO₃H substituents |
| (k-2) | 2-chloro-5-methylbenzenesulfonic acid | 3-cyano-2,5-dimethyl-4-phenylthiophene | same pyridine core as (k-1) |
| (k-3) | 5-methylbenzene-1,3-disulfonic acid | methyl 3-cyano-2,5-dimethylthiophene-4-carboxylate | same pyridine core as (k-1) |
| (k-4) | 5-methylbenzene-1,3-dicarboxylic acid | 3-cyano-2,5-dimethyl-4-methylthiophene | same pyridine core as (k-1) with two SO₃H phenyl groups |

TABLE 1-continued $$A-N=N-B-N=N-C$$

| | A | B | C |
|---|---|---|---|
| (k-5) | naphthalene with HO₃S, SO₃H, and methyl substituents | 2,5-dimethyl-4-phenyl-thiophene-3-carbonitrile | pyridine with CN, CH₃, NH-phenyl-SO₃H, and NH-phenyl-SO₃H substituents |
| (k-6) | naphthalene with SO₃H, SO₃H, and methyl substituents | methyl 5-cyano-2-methylthiophene-3-carboxylate variant | pyridine with CN, CH₃, NH-phenyl-SO₃H, and NH-phenyl substituents |
| (k-7) | naphthalene with SO₃H, HO₃S, and methyl substituents | 3-cyano-2,5-dimethyl-4-methylthiophene | pyridine with CN, CH₃, NH-phenyl-SO₃H, and NH-phenyl-SO₃H substituents |
| (l-1) | 2-methylterephthalic acid | 3-cyano-2,5-dimethyl-4-methylthiophene | pyridine with CN, CH₃, NH-phenyl-SO₃H, and NH-phenyl-SO₃H substituents |

TABLE 1-continued $$A-N=N-B-N=N-C$$

| | A | B | C |
|---|---|---|---|
| (I-2) | | | |
| (I-3) | | | |
| (I-4) | | | |
| (I-5) | | | |

TABLE 1-continued
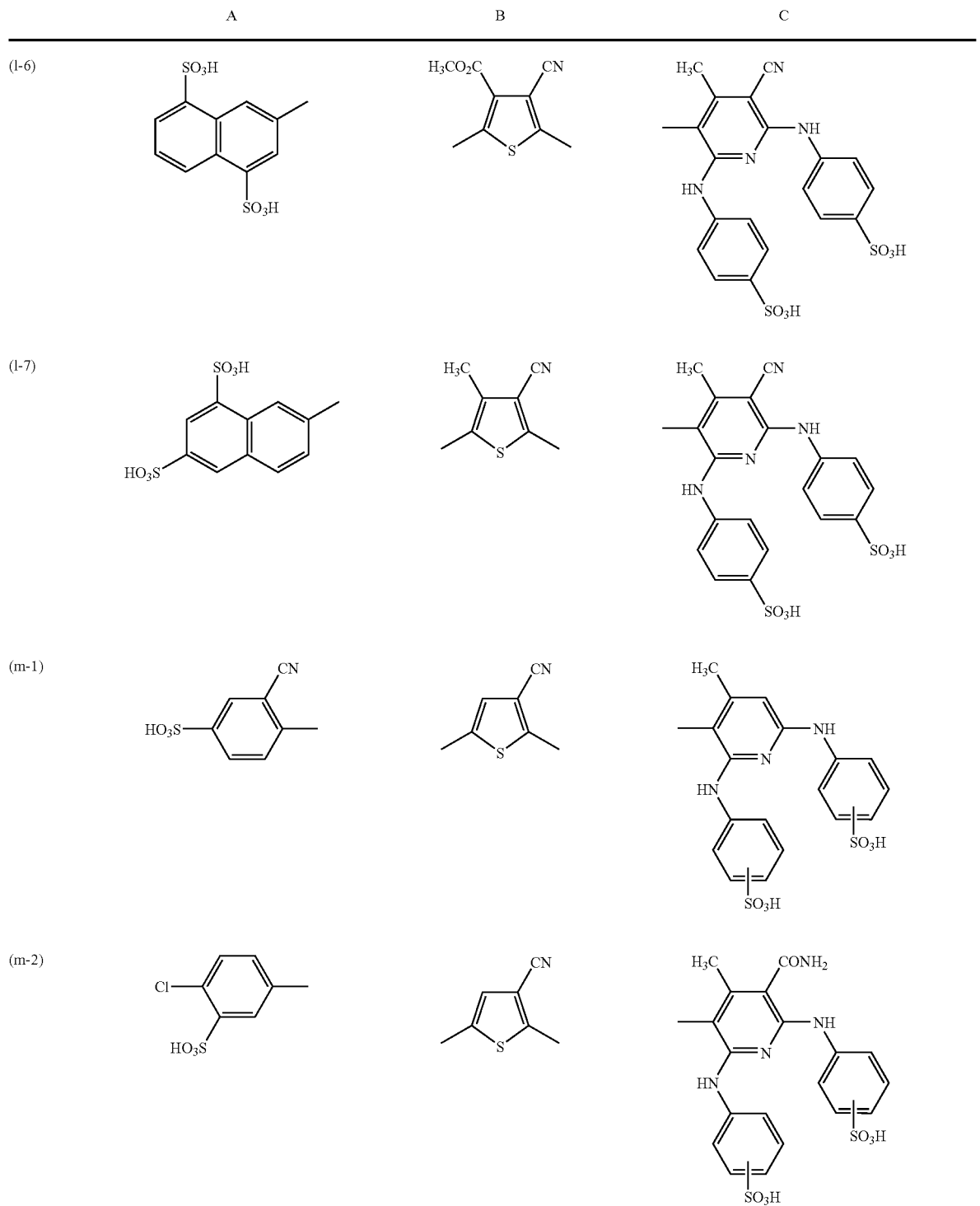

TABLE 1-continued $$A-N=N-B-N=N-C$$

| | A | B | C |
|---|---|---|---|
| (m-3) | | | |
| (m-4) | | | |
| (m-5) | | | |
| (m-6) | | | |

TABLE 1-continued
A—N=N—B—N=N—C
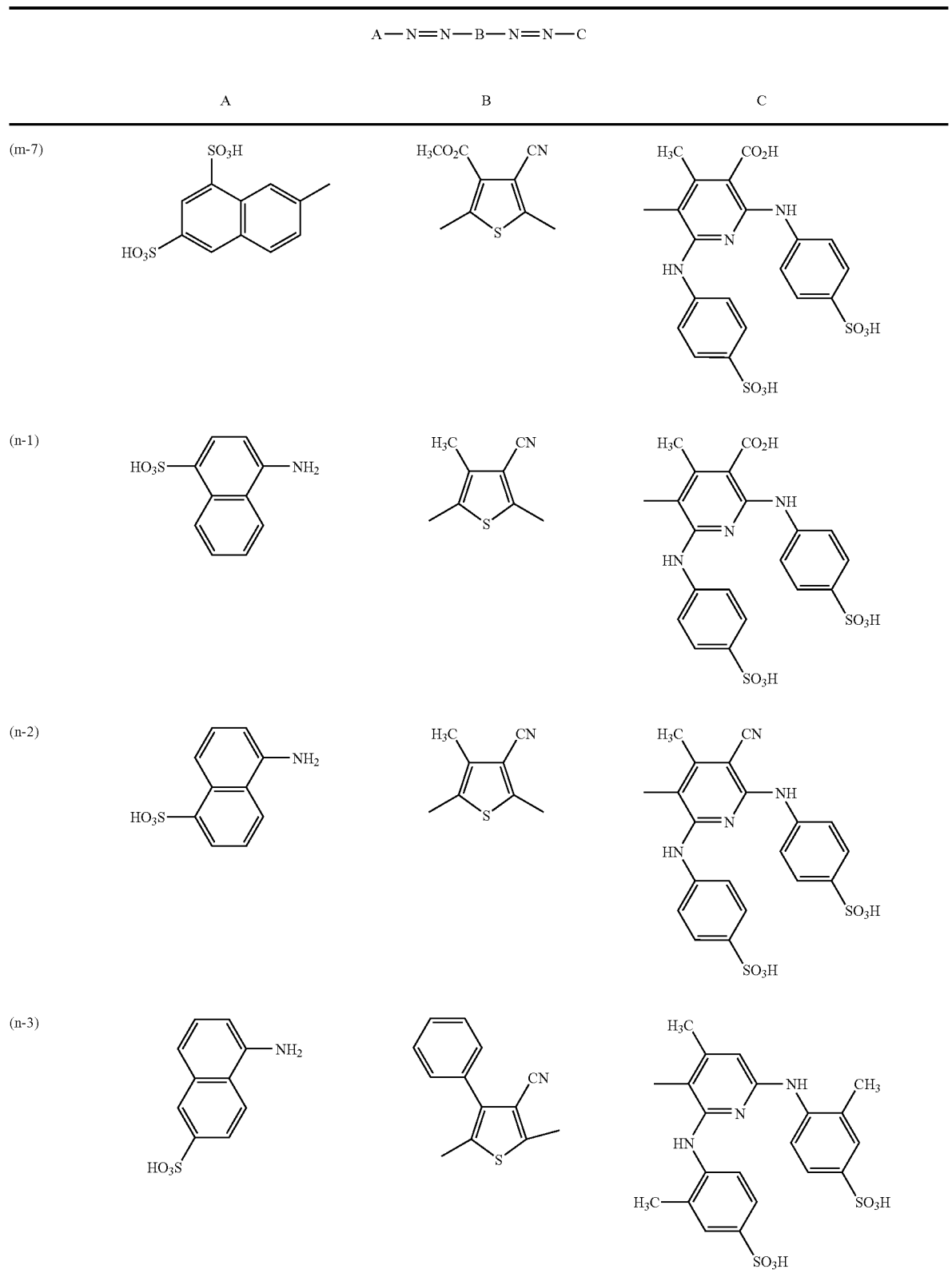

TABLE 1-continued
A—N═N—B—N═N—C
| | A | B | C |
|---|---|---|---|
| (n-4) | 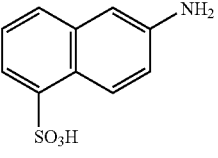 | 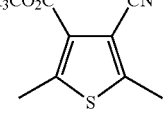 | 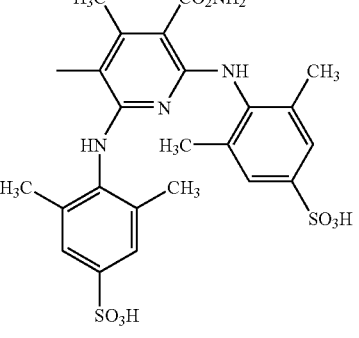 |
| (n-5) | 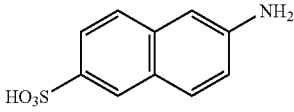 | 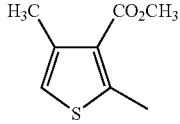 | 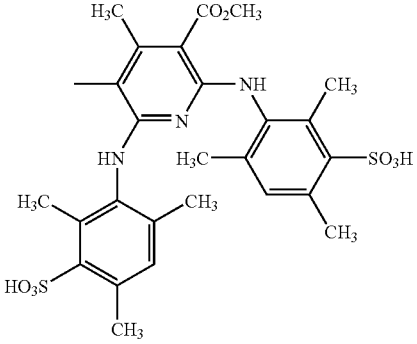 |
| (n-6) | 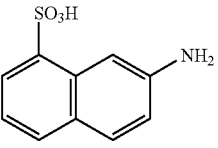 | 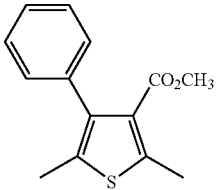 | 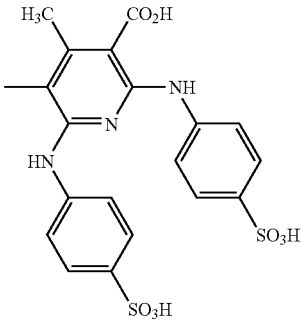 |
| (n-7) | 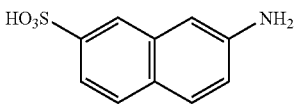 | 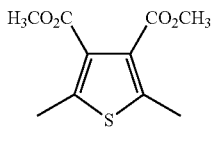 | 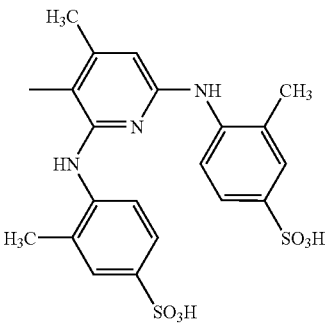 |

TABLE 1-continued
A—N=N—B—N=N—C
| | A | B | C |
|---|---|---|---|
| (o-1) | 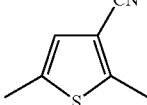 | 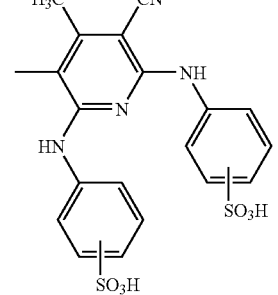 | 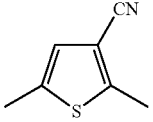 |
| (o-2) | 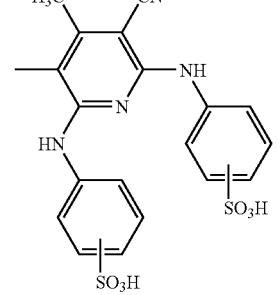 | | 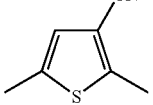 |
| (o-3) | 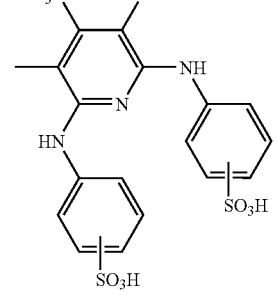 | | 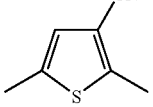 |
| (o-4) | 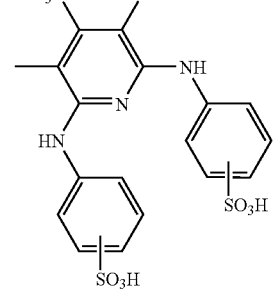 | | |

TABLE 1-continued
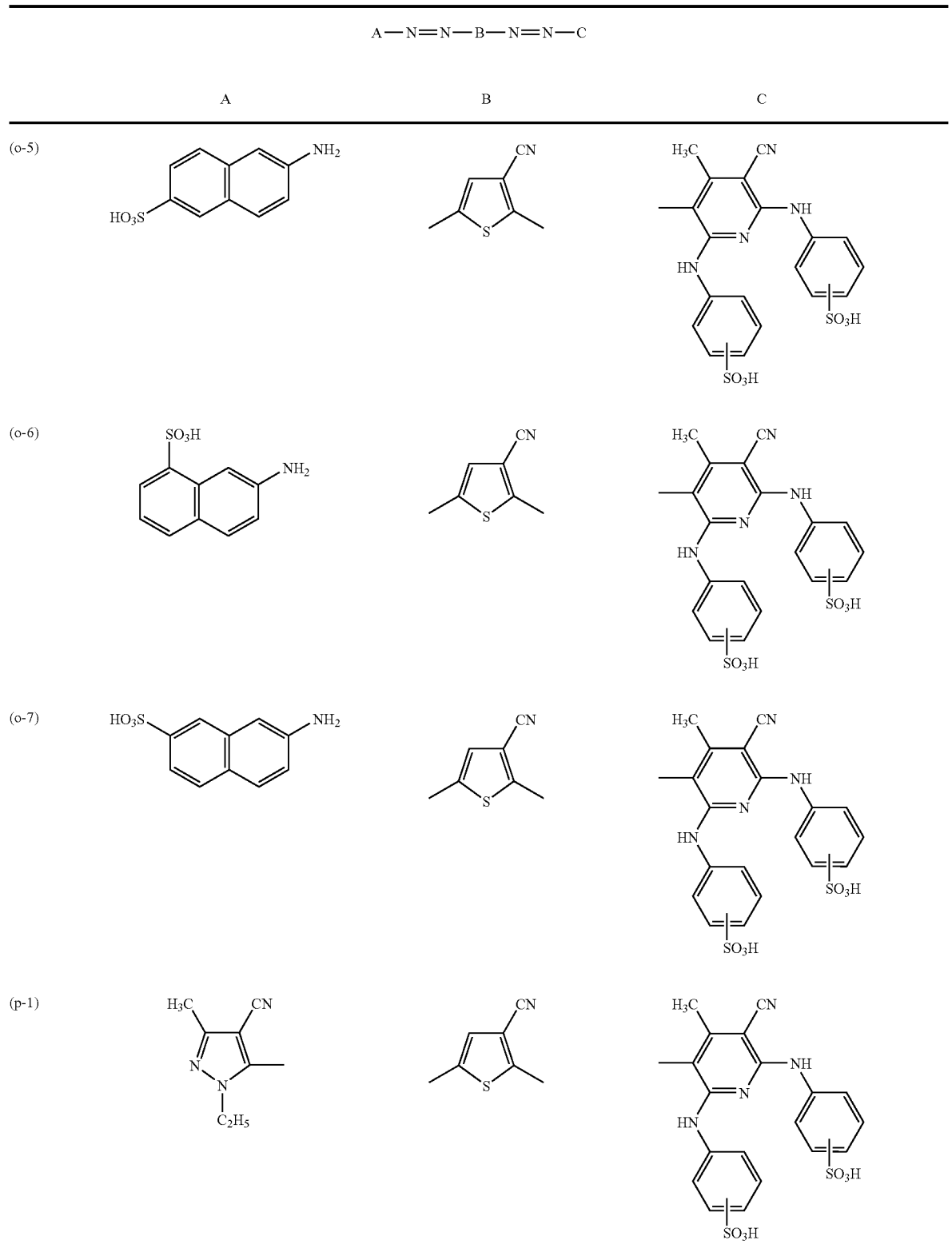

TABLE 1-continued $$A-N=N-B-N=N-C$$

| | A | B | C |
|---|---|---|---|
| (p-2) | 3,5-dimethyl-4-cyano-1H-pyrazole | 2,5-dimethyl-3-cyanothiophene | pyridine with CN, CH3, NH-phenyl-SO3H substituents |
| (p-3) | 3-methylpyridine | 2,5-dimethyl-3-cyanothiophene | pyridine with CN, CH3, NH-phenyl-SO3H substituents |
| (p-4) | 4,5-dicyano-2-methyl-1H-imidazole | 2,5-dimethyl-3-cyanothiophene | pyridine with CN, CH3, NH-phenyl-SO3H substituents |
| (p-5) | 4,5-dicyano-2-methyl-1-ethylimidazole | 2,5-dimethyl-3-cyanothiophene | pyridine with CN, CH3, NH-phenyl-SO3H substituents |

TABLE 1-continued
A—N=N—B—N=N—C
| | A | B | C |
|---|---|---|---|
| (p-6) | 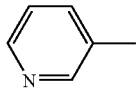 | 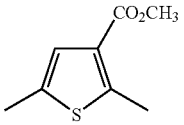 | 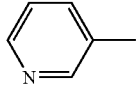 |
| (p-7) | 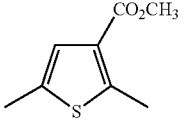 | 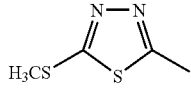 | 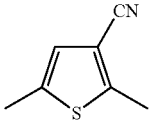 |
| (q-1) | 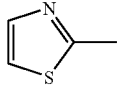 | 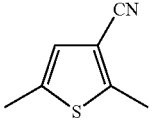 | 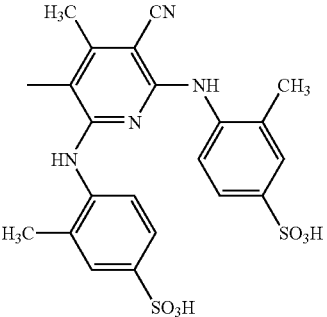 |
| (q-2) | 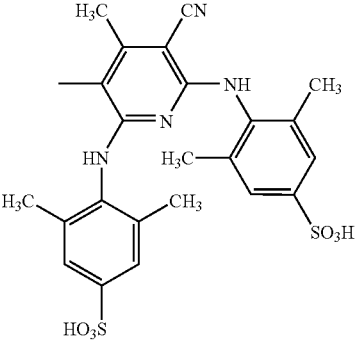 | 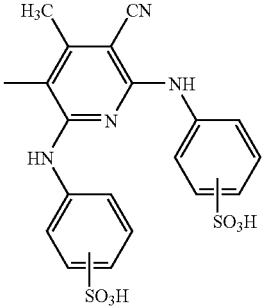 | 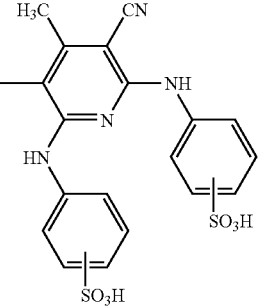 |

TABLE 1-continued
$$A-N=N-B-N=N-C$$
| | A | B | C |
|---|---|---|---|
| (q-3) | 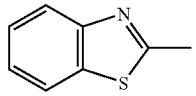 | 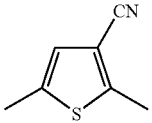 | 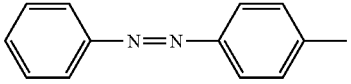 |
| (q-4) | 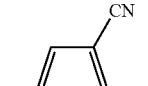 | 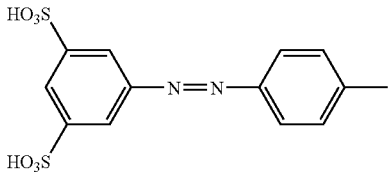 | 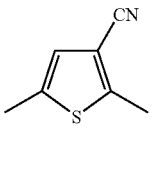 |
| (q-5) | 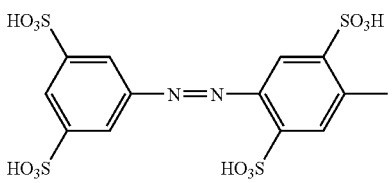 | 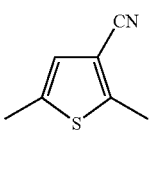 | 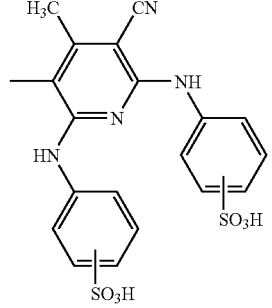 |
| (q-6) | 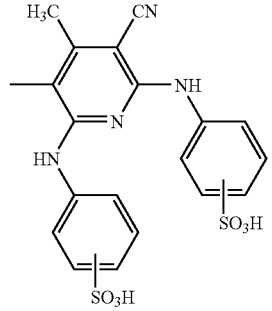 | 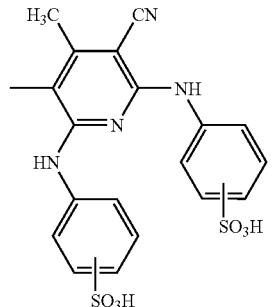 | 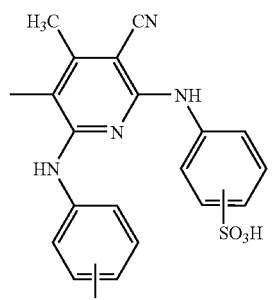 |

TABLE 1-continued $$A-N=N-B-N=N-C$$

| | A | B | C |
|---|---|---|---|
| (q-7) | structure | structure | structure |
| (r-1) | structure | structure | structure |
| (r-2) | structure | structure | structure |
| (r-3) | structure | structure | structure |

TABLE 1-continued
A—N═N—B—N═N—C
| | A | B | C |
|---|---|---|---|
| (r-4) | 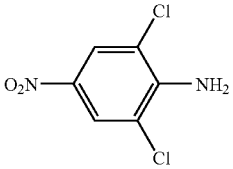 | 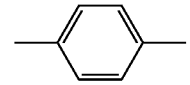 | 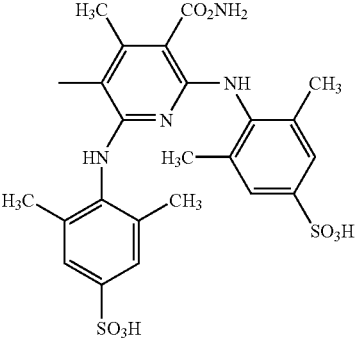 |
| (r-5) | 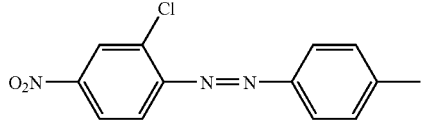 | 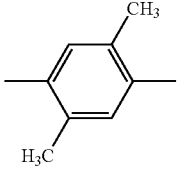 | 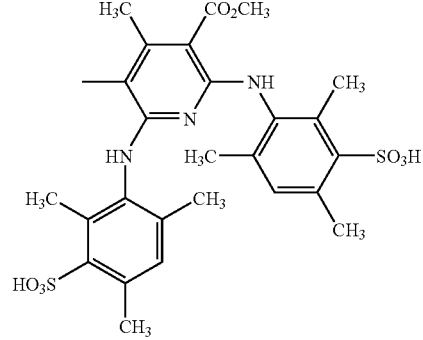 |
| (r-6) | 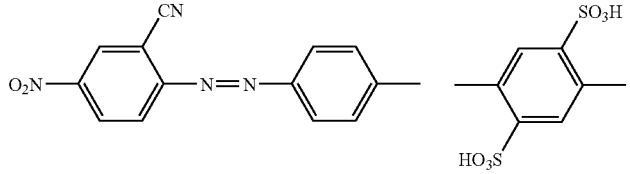 | 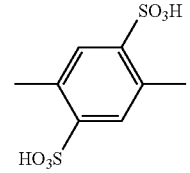 | 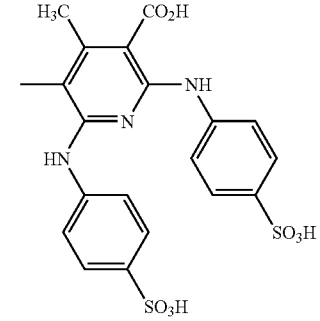 |
| (r-7) | 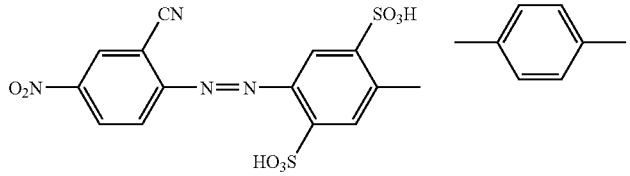 | 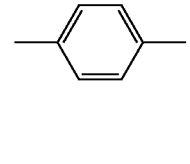 | 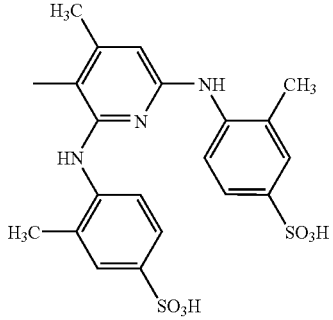 |

TABLE 1-continued
$$A-N=N-B-N=N-C$$
| | A | B | C |
|---|---|---|---|
| (s-1) | 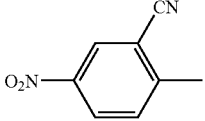 |  | 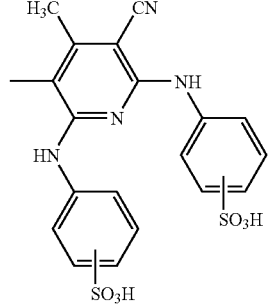 |
| (s-2) | 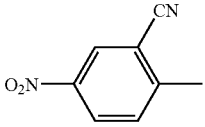 | 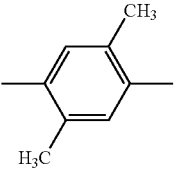 | 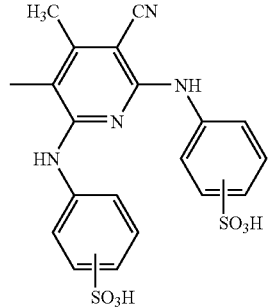 |
| (s-3) | 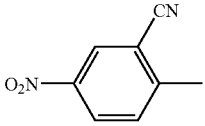 | 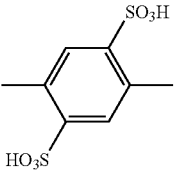 | 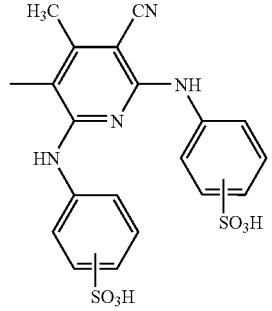 |
| (s-4) | 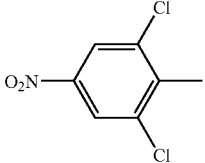 |  | 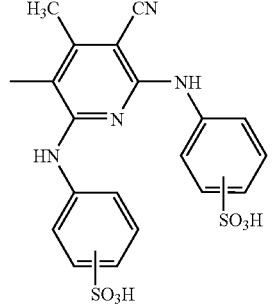 |

TABLE 1-continued
$$A-N=N-B-N=N-C$$
| | A | B | C |
|---|---|---|---|
| (s-5) | 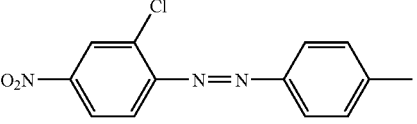 | 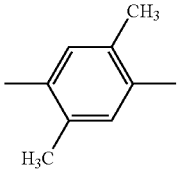 | 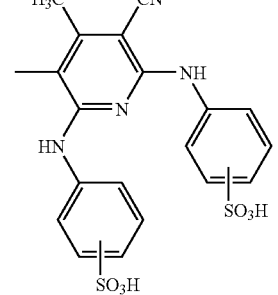 |
| (s-6) | 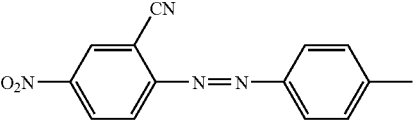 | 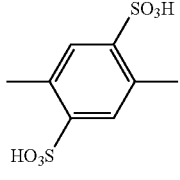 | 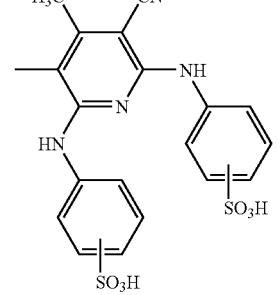 |
| (s-7) | 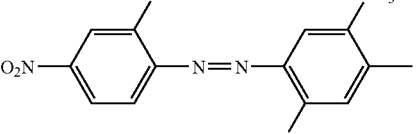 |  | 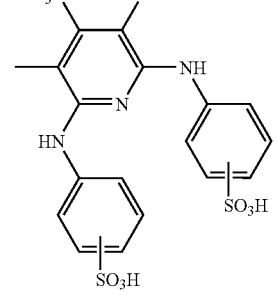 |
| (t-1) | 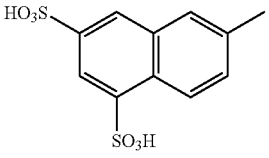 | 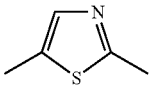 | 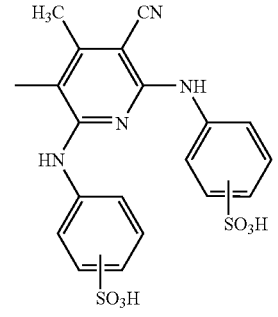 |

TABLE 1-continued
$$A-N=N-B-N=N-C$$
| | A | B | C |
|---|---|---|---|
| (t-2) | 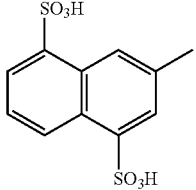 | 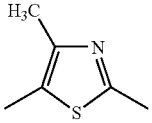 | 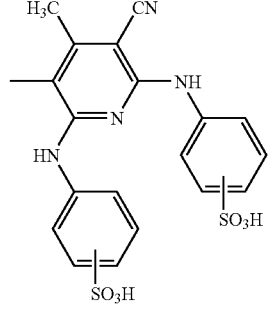 |
| (t-3) | 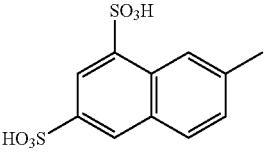 | 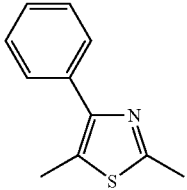 | 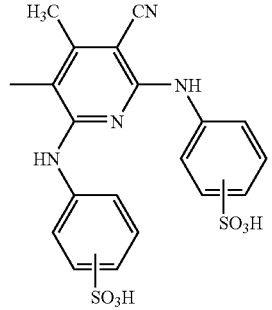 |
| (t-4) | 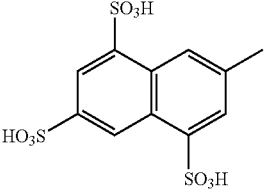 | 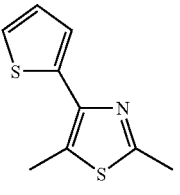 | 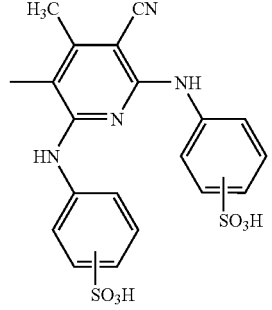 |
| (t-5) | 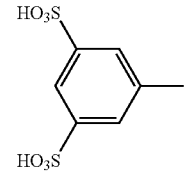 | 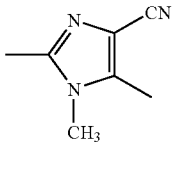 | 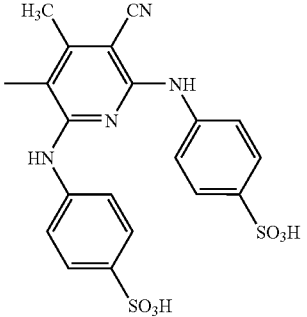 |

TABLE 1-continued $$A-N=N-B-N=N-C$$

| | A | B | C |
|---|---|---|---|
| (t-6) | | | |
| (t-7) | | | |
| (u-1) | | | |
| (u-2) | | | |
| (u-3) | | | |

TABLE 1-continued $$A-N=N-B-N=N-C$$

| | A | B | C |
|---|---|---|---|
| (u-4) | | | |
| (u-5) | | | |
| (u-6) | | | |
| (u-7) | | | |
| (v-1) | | | |

TABLE 1-continued
$$A-N=N-B-N=N-C$$
| A | B | C |
|---|---|---|
(v-2)
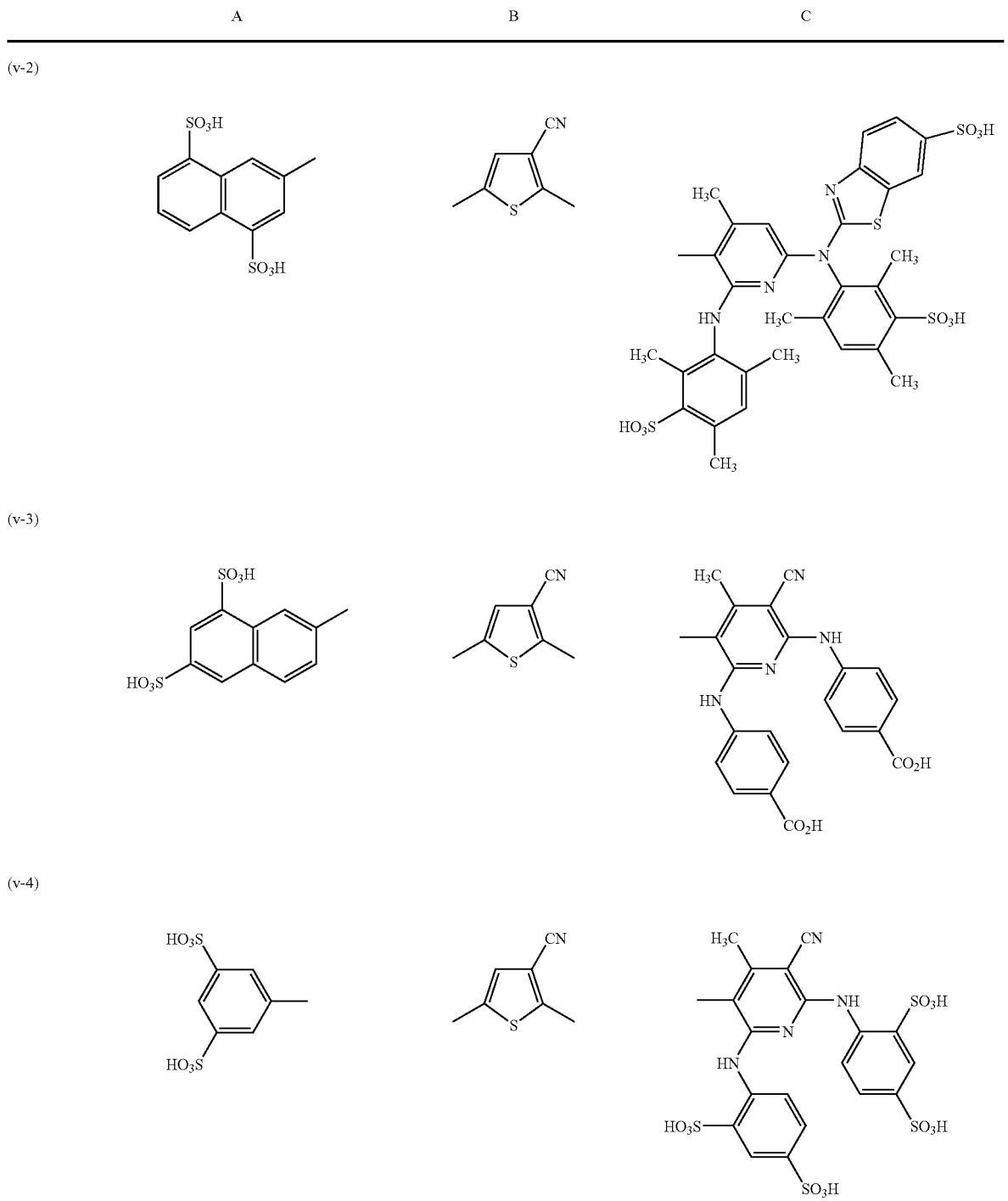
(v-3)
(v-4)

TABLE 1-continued

A—N=N—B—N=N—C

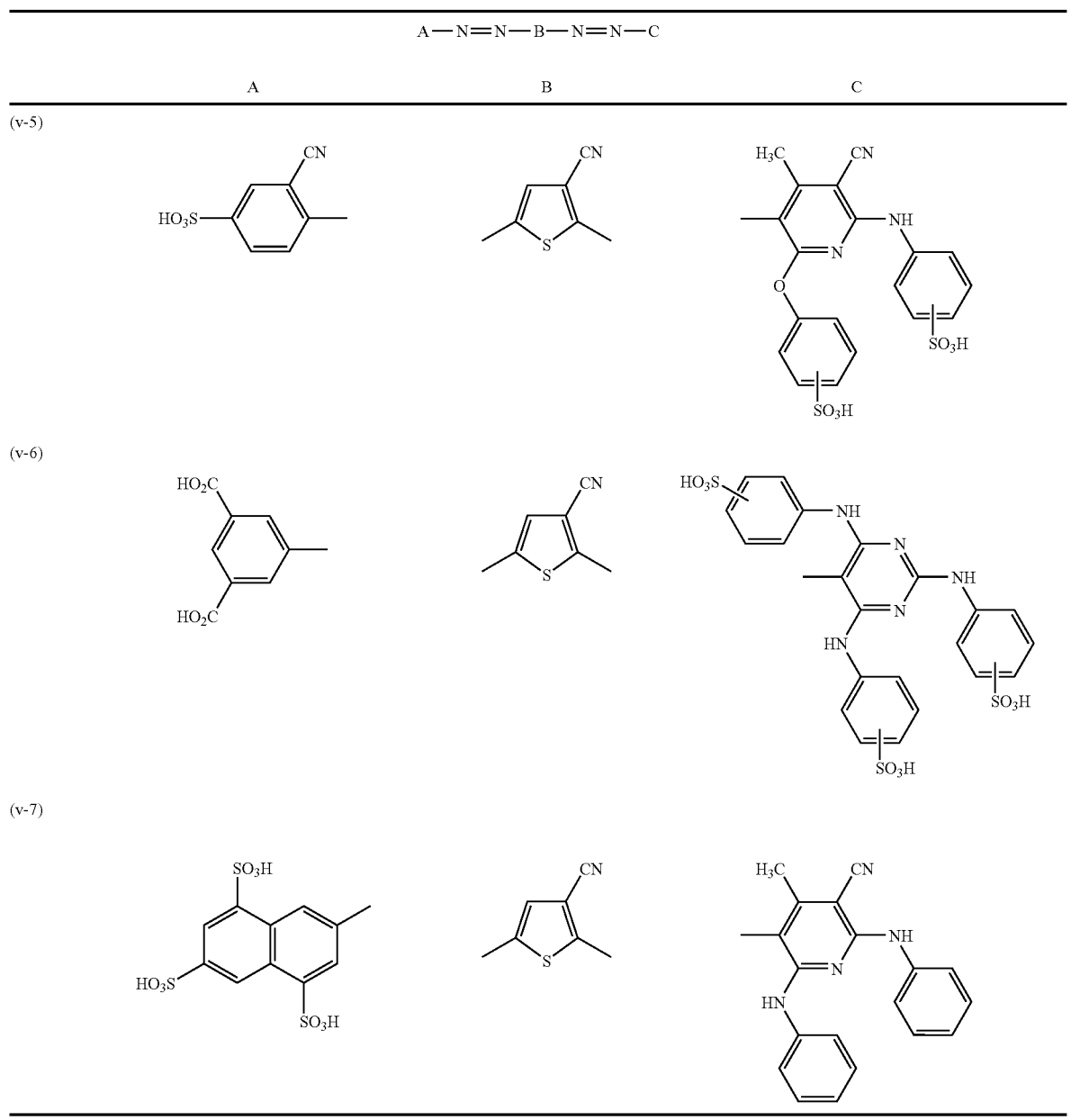

The dye represented by the above general formula (I) can be synthesized by a coupling reaction of a diazo component with a coupler. The following show Synthetic Examples of the dyes represented by the general formula (I). M/S was measured by LC/MS, ESI, Nega direct introduction. Eluting liquids for use in the measurement were Liquid A: water (0.1% triethylamine, acetic acid) and Liquid B: acetonitrile (0.1% triethylamine, acetic acid), and the measurement was carried out in a Liquid B concentration of 90%.

SYNTHETIC EXAMPLE OF DYE a-1

Into 15 ml of acetic acid and 15 ml of 85% phosphoric acid was dispersed 1.5 g of a diazo component A-1, and while the liquid temperature was maintained at −2 to 0° C., 2.2 g of 40% nitrosylsulfuric acid was added thereto. The resulting liquid was added under stirring to a solution of 3.3 g of a coupler component B-1 dissolved in 25 ml of water, followed by 1 hour of reaction at 0 to 5° C. To the reaction liquid was added 5.0 g of lithium chloride, and the precipitated crystals were filtered and washed. The thus obtained wet cake was added to 100 ml of water, the pH of the resulting solution was adjusted to 7 to 8 with 0.1 N aqueous lithium chloride solution, and then 300 ml of isopropyl alcohol was added thereto. The precipitated crystals were filtered and washed. This operation was performed again to obtain 2.3 g of an objective product (lithium salt of a-1) (M/S: $(M-H)^-$=698, $(M-2H)^{2-}$=348.5; $\lambda_{max}$ (water)=580 nm).

The synthetic route was shown below. In the following synthetic routes, the products are shown not as lithium salts but as free acids).

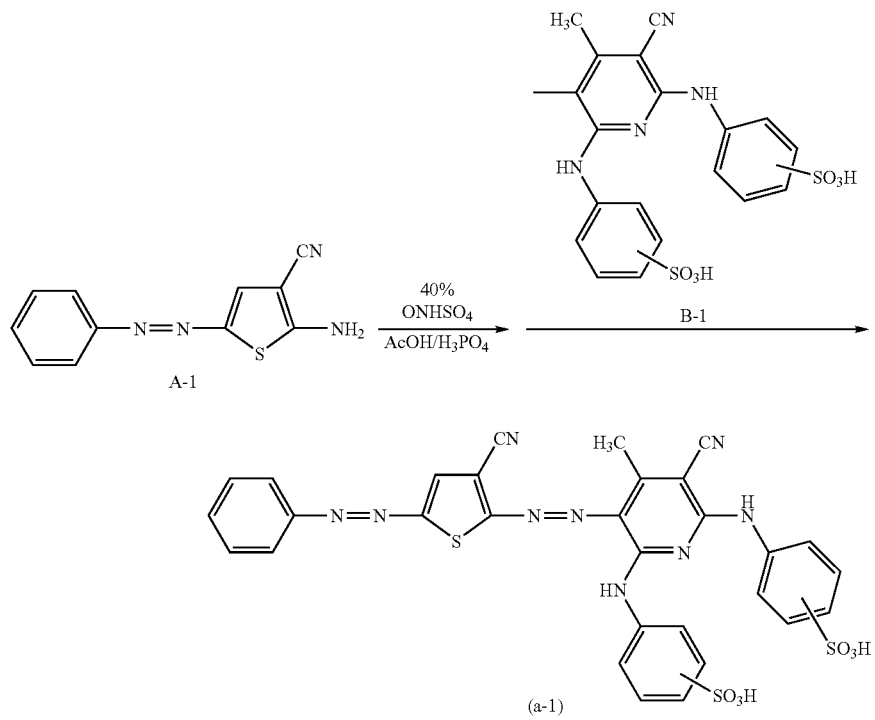

SYNTHETIC EXAMPLE OF DYE c-7

Into 15 ml of acetic acid and 15 ml of 85% phosphoric acid was dispersed 2.0 g of a diazo component A-2, and while the liquid temperature was maintained at −2 to 0° C., 2.2 g of 40% nitrosylsulfuric acid was added thereto. The resulting liquid was added under stirring to a solution of 3.0 g of a coupler component B-1 dissolved in 30 ml of water, followed by 1 hour of reaction at 0 to 5° C. To the reaction liquid was added 5.0 g of lithium chloride, and the precipitated crystals were filtered and washed. The thus obtained wet cake was added to 100 ml of water, the pH of the resulting solution was adjusted to 7 to 8 with 0.1 N aqueous lithium chloride solution, and then 300 ml of isopropyl alcohol was added thereto. The precipitated crystals were filtered and washed. This operation was performed again to obtain 2.9 g of an objective product (lithium salt of c-7) (M/S: (M−H)$^-$=778, (M−2H)$^{2-}$=388.5; $\lambda_{max}$ (water)=580 nm).

The synthetic route was shown below.

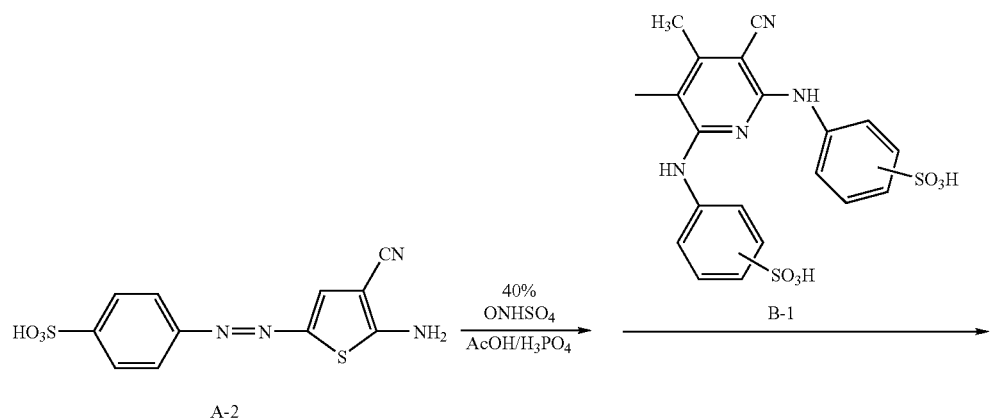

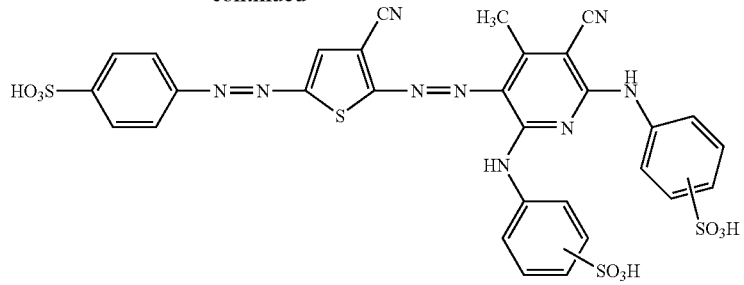

(b-7)

SYNTHETIC EXAMPLE OF DYE e-2

Into 7.5 ml of acetic acid and 7.5 ml of 85% phosphoric acid was dispersed 0.75 g of a diazo component A-3, and while the liquid temperature was maintained at −2 to 0° C., 0.77 g of 40% nitrosylsulfuric acid was added thereto. The resulting liquid was added under stirring to a solution of 1.20 g of a coupler component B-1 dissolved in 15 ml of water, followed by 1 hour of reaction at 0 to 5° C. To the reaction liquid were added 5.0 g of lithium chloride and 30 ml of isopropyl alcohol, successively, and the precipitated crystals were filtered and washed. The thus obtained wet cake was added to 100 ml of water, the pH of the resulting solution was adjusted to 7 to 8 with 0.1 N aqueous lithium chloride solution, and then 300 ml of isopropyl alcohol was added thereto. The precipitated crystals were filtered and washed. This operation was performed again to obtain 1.0 g of an objective product (lithium salt of e-2) (M/S: $(M-H)^-=786$, $(M-2H)^{2-}=392.5$; $\lambda_{max}$ (water)=582 nm).

The synthetic route was shown below.

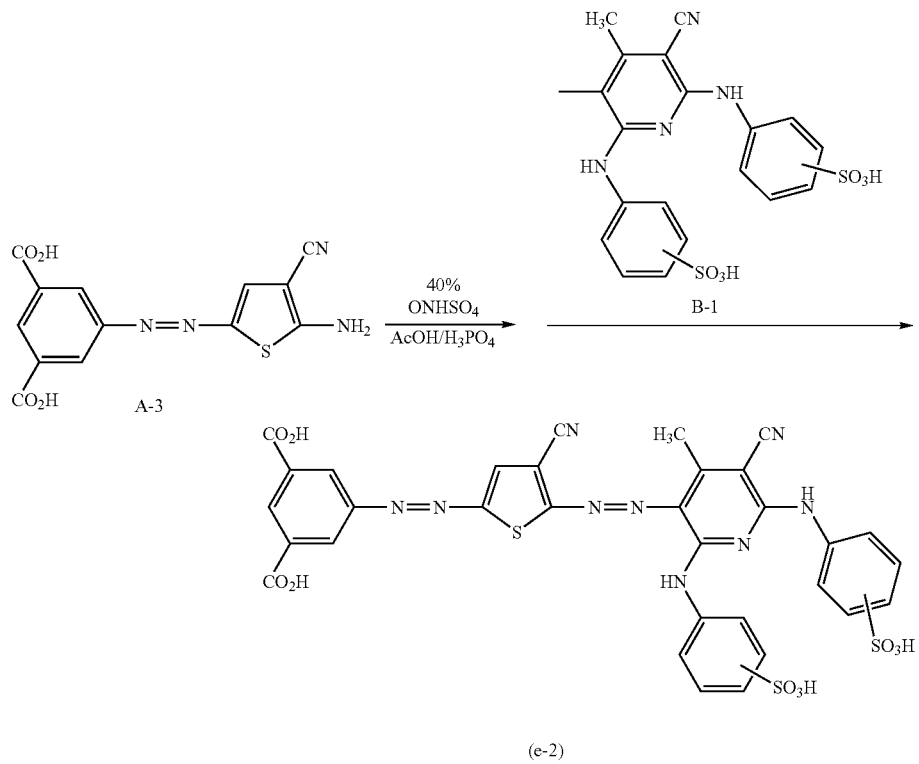

(e-2)

SYNTHETIC EXAMPLE OF DYE i-1

Into 20 ml of acetic acid and 20 ml of 85% phosphoric acid was dispersed 1.0 g of a diazo component A-4, and while the liquid temperature was maintained at −2 to 0° C., 0.7 g of 40% nitrosylsulfuric acid was added thereto. The resulting liquid was added under stirring to a solution of 1.1 g of a coupler component B-1 dissolved in 30 ml of water, followed by 1 hour of reaction at 0 to 5° C. To the reaction liquid were added 5.0 g of lithium chloride and 30 ml of isopropyl alcohol, successively. The precipitated crystals were filtered and washed. The thus obtained wet cake was added to 100 ml of water, the pH of the resulting solution was adjusted to 7 to 8 with 0.1 N aqueous lithium chloride solution, and then 300 ml of isopropyl alcohol was added thereto. The precipitated crystals were filtered and washed. This operation was performed again to obtain 0.9 g of an objective product (lithium salt of i-1) (M/S: (M−H)⁻=908, (M−2H)²⁻=453.5; $\lambda_{max}$ (water)=590 nm)

The synthetic route was shown below.

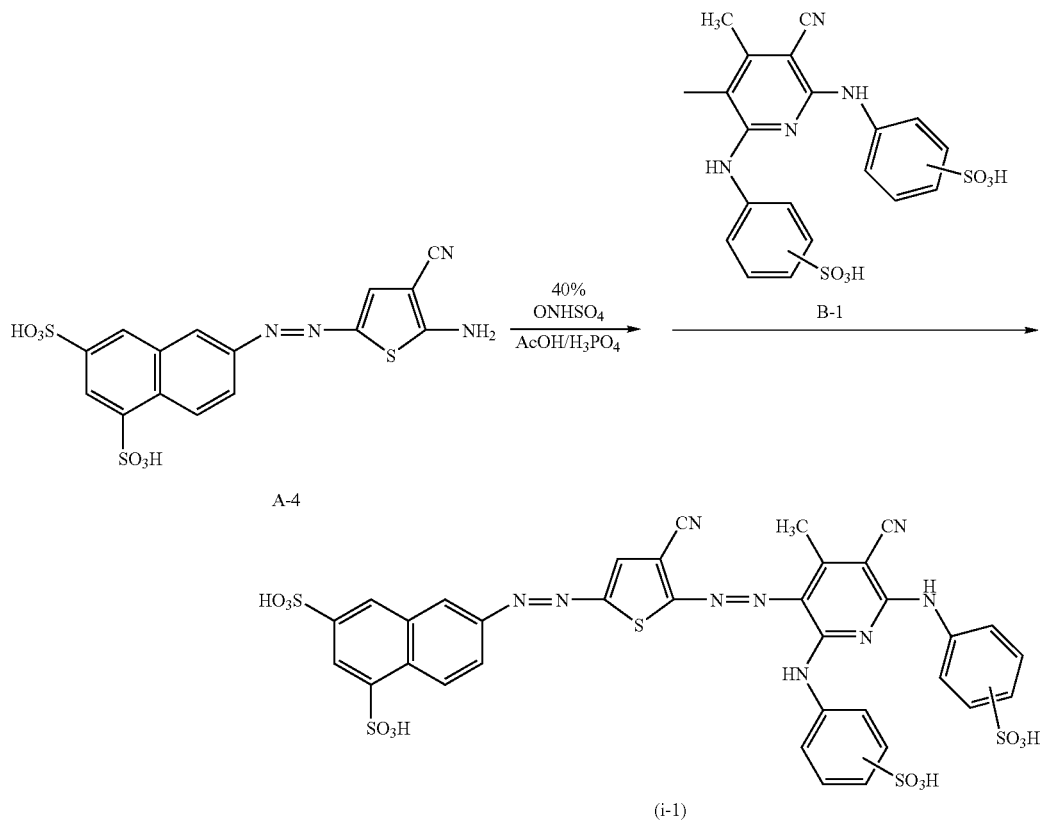

In addition to the above, the following compounds were synthesized in a similar manner to the method mentioned above.

| A | B | C | λ max (water) | MS(M-H)⁻ | MS(M-2H)²⁻ |
|---|---|---|---|---|---|
| 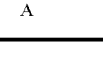 | 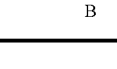 | 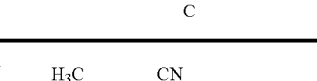 | 582 nm | 786 | 392.5 |

-continued

| A | B | C | λ max (water) | MS(M-H)⁻ | MS(M-2H)²⁻ |
|---|---|---|---|---|---|
| | | | 585 nm | 822 | 410.5 |
| | | | 605 nm | 858 | 428.5 |
| | | | 594 nm | 858 | 428.5 |
| | | | 590 nm | 908 | 453.5 |
| | | | 596 nm | 908 | 453.5 |

-continued

| A | B | C | λ max (water) | MS(M-H)⁻ | MS(M-2H)²⁻ |
|---|---|---|---|---|---|
| | | | 598 nm | 908 | 453.5 |
| | | | 612 nm | 988 | 493.5 |
| | | | 594 nm | 936 | 467.5 |
| | | | 595 nm | 1068 | 533.5 |
| | | | 584 nm | 946 | 472.5 |

-continued
| A | B | C | λ max (water) | MS(M-H)⁻ | MS(M-2H)²⁻ |
|---|---|---|---|---|---|
| 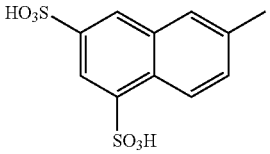 | 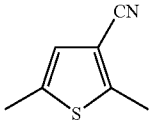 | 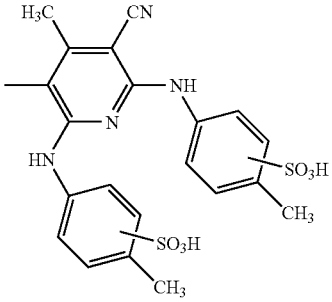 | 579 nm | 936 | 467.5 |
| 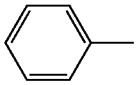 | 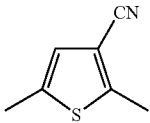 | 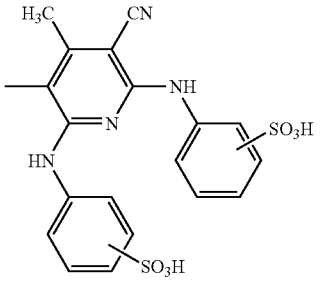 | 558 nm | 698 | 348.5 |
| 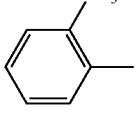 | 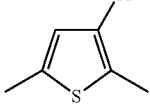 | 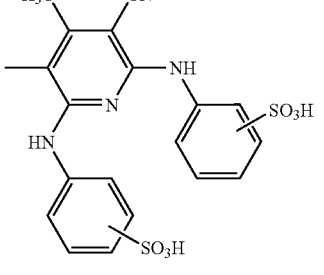 | 557 nm | 712 | 355.5 |
| 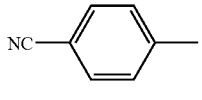 | 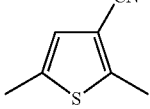 | 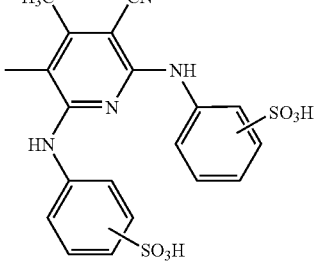 | 568 nm | 723 | 361 |
| 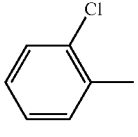 | 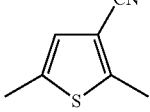 | 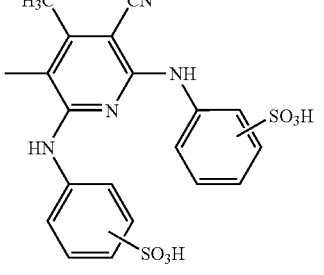 | 563 nm | 732 | 365.5 |

-continued

| A | B | C | λ max (water) | MS(M-H)⁻ | MS(M-2H)²⁻ |
|---|---|---|---|---|---|
| 4-HO₃S-C₆H₄- | 2,5-dimethyl-3-cyano-thiophene | pyridine derivative | 580 nm | 778 | 388.5 |
| 3-HO₃S-C₆H₄- | 2,5-dimethyl-3-cyano-thiophene | pyridine derivative | 574 nm | 778 | 388.5 |
| 2-HO₃S-C₆H₄- | 2,5-dimethyl-3-cyano-thiophene | pyridine derivative | 579 nm | 778 | 388.5 |
| 3-(H₂O₃P)-C₆H₄- | 2,5-dimethyl-3-cyano-thiophene | pyridine derivative | 573 nm | 778 | 388.5 |
| 3-Cl-4-methyl-HO₃S-C₆H₃- | 2,5-dimethyl-3-cyano-thiophene | pyridine derivative | 588 nm | 812 | 405.5 |

-continued

| A | B | C | λ max (water) | MS(M-H)⁻ | MS(M-2H)²⁻ |
|---|---|---|---|---|---|
| (structure) | (structure) | (structure) | 595 nm | 803 | 401 |
| (structure) | (structure) | (structure) | 598 nm | 803 | 401 |
| (structure) | (structure) | (structure) | 594 nm | 846 | 422.5 |
| (structure) | (structure) | (structure) | 580 nm | 812 | 405.5 |

The coloring composition of the invention is not particularly limited as far as it contains the abovementioned specific azo compound. However, the composition may contain various substances depending on the applications of the coloring composition. For example, as an ink composition, the compound is dissolved or dispersed into a medium (an oil-soluble or water soluble medium) and further, it is preferable to add additives to be mentioned later for suitably satisfying desired properties and performance as the ink composition.

Also, those used in the color toner composition described in JP-A-7-209912, the color filter resist composition described in JP-A-6-35182, and the thermally transferring dye-providing material described in JP-A-7-137466 may be incorporated. (The term "JP-A" as used herein means an "unexpected published Japanese patent application".)

The specific azo compound contained in the coloring composition of the invention is used after adjusting the properties such as solubility, dispersibility, and thermal mobility so as to be suitable for individual uses by substituents. Moreover, the specific azo compound contained in the coloring composition of the invention may be used in a dissolved state or an emulsified or dispersed state, or even in a solid dispersed state depending on the system to be used.

The applications of the coloring composition of the invention containing the specific azo compound include various image-recording materials for the formation of images, in particular color images, more specifically, inkjet recording materials, heat-sensitive recording materials, pressure-sensitive recording materials, electrophotographic recording materials, transfer-type silver halide photosensitive materials, printing inks, recording pens, ink compositions, and the like. Preferred applications include ink compositions and inkjet recording materials.

Moreover, the coloring composition can be also applied to solid image pickup devices such as CCD, color filters for recording and reproducing color images for use in displays such as LCD and PDP, and dyeing solutions for dyeing various fabrics.

The following will describe an ink composition as a preferable composition comprising the abovementioned coloring composition, particularly an inkjet recording ink composition in detail.

[Ink Composition]

An ink composition, for example an inkjet recording ink composition can be prepared by dissolving and/or dispersing the abovementioned specific azo compound in a lipophilic medium or an aqueous medium. Preferably, an aqueous medium is used. As required, the other additives are incorporated within a range where the effects of the invention are impaired. Examples of the other additives include known additives such as a drying inhibitor (a wetting agent), a emulsion stabilizer, a penetration accelerator, a ultraviolet ray absorber, a fading-preventing agent, an anti-fungal agent, a pH regulator, a surface tension regulator, an antifoaming agents, a preservative, a viscosity regulator, a dispersing agent, a dispersion stabilizer, a rust proofing agent, a chelating agent, and the like. In the case of water-soluble ink, these various additives are directly added to the ink liquid. In the case that an oil-soluble dye is used in a dispersion form, the additives are generally added to a dye dispersion after its preparation but they may be added to an oily phase or an aqueous phase at the preparation.

The drying inhibitor is suitably used for the purpose of preventing clogging of an ink injection port of a nozzle to be used in the inkjet recording mode, the clogging being caused by drying of the inkjet recording ink.

The drying inhibitor is preferably a water soluble organic solvent having a vapor pressure lower than water. Specific examples thereof include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, trimethylol propane, and the like; lower alkyl ethers of polyhydric alcohols, such as ethylene glycol monomethyl (or monoethyl) ether, diethylene glycol monomethyl (or monoethyl) ether, triethylene glycol monoethyl (or monobutyl) ether or the like; heterocyclic compounds such as 2-pyrrolidone, N-methyl-2-pyrrolidone, 1,3-dimethyl-2-imidazolidinone, N-ethylmorpholine and the like; sulfur-containing compounds such as sulfolane, dimethylsulfoxide, 3-sulfolene and the like; polyfunctional compounds such as diacetone alcohol, diethanolamine, and the like; and urea derivatives. Of these, polyhydric alcohols such as glycerin, diethylene glycol and the like are more preferable. The drying inhibitor may be used singly or two or more of them may be used in combination. The drying inhibitor is preferably contained in the ink is in an amount of 10 to 50% by mass.

The penetration accelerator is preferably used for the purpose of better penetration of the inkjet ink into paper. As the penetration accelerator, alcohols such as ethanol, isopropanol, butanol, di(tri)ethylene glycol monobutyl ether, 1,2-hexanediol and the like; sodium lauryl sulfate, sodium oleate, nonionic surfactants, and the like can be used. When the penetration accelerator is contained in the ink in an amount of 5 to 30% by mass, sufficient effects are usually exhibited, and it is preferable to use it within a range where bleeding of the printed characters or print-through do not occur.

The ultraviolet ray absorber is used for the purpose of enhancing the storability of images. As the ultraviolet ray absorber, usable are the benzotriazole-based compounds described in JP-A-58-185677, JP-A-61-190537, JP-A-2-782, JP-A-5-197075, JP-A-9-34057, and the like; the benzophenone-based compounds described in JP-A-46-2784, JP-A-5-194483, U.S. Pat. No. 3,214,463 and the like; the cinnamic acid-based compounds described in JP-B-48-30492 (the term "JP-B" as used herein means an "examined Japanese patent publication".) and JP-B-56-21141, JP-A-10-88106 and the like; the triazine-based compounds described in JP-A-4-298503, JP-A-8-53427, JP-A-8-239368, JP-A-10-182621, JP-W-8-501291 (the term "JP-W" as used herein means a "published Japanese translation of a PCT patent application".), and the like; compounds described in *Research Disclosure* No. 24239; and compounds that absorb ultraviolet ray and emit fluorescent light, so-called fluorescent brightening agents, represented by stilbene-based compounds and benzooxazole-based compounds.

The fading-preventing agent is used for the purpose of enhancing the storability of images. As the fading-preventing agent, various organic or metal complex-based fading-preventing agents can be used. Examples of the organic fading-preventing agents include hydroquinones, alkoxyphenols, dialkoxyphenols, phenols, anilines, amines, indanes, chromans, alkoxyanilines, heterocyclic compounds, and the like. Examples of metal complex fading-preventing agents include nickel complexes, zinc complexes, and the like. Concretely, there can be used compounds described in the patents cited in *Research Disclosure* No. 17643 Chapter VII, items I to J, ibid., No. 15162, ibid., No. 18716, page 650, left column, ibid., No. 36544, page 527, ibid., No. 307105, page 872, ibid., No. 15162; compounds falling within the general formulas of representative compounds and compound examples described in JP-A-62-215272, pages 127 to 137.

Examples of the anti-fungal agent include sodium dehydroacetate, sodium benzoate, sodium pyridinethion-1-oxide, ethyl p-hydroxybenzoate, 1,2-benzoisothiazolin-3-on, and salts thereof. It is preferable to use the anti-fungal agent in the ink in an amount of 0.02 to 1.00% by mass.

As the pH regulator, the above neutralizing agents (organic bases and inorganic alkali) can be used. For the purpose of enhancing the storage stability of the inkjet recording ink, the pH regulator is added such that the inkjet recording ink preferably has a pH of 6 to 10, and more preferably a pH of 7 to 10.

Examples of the surface tension regulator include nonionic, cationic, or anionic surfactants. The surface tension of the inkjet recording ink composition of the invention is preferably from 20 to 60 mN/m, and more preferably from 25 to 45 mN/m. The viscosity of the inkjet recording ink composition of the invention is preferably regulated to 30 mPa·s or less and more preferably 20 mPa·s or less.

Examples of the surfactant preferably include anionic surfactants such as fatty acid salts, alkyl sulfate salts, alkylbenzenesulfonic acid salts, alkylnaphthalenesulfonic acid salts, dialkylsulfosuccinic acid salts, alkyl phosphate salts, naphthalenesulfonic acid formalin condensate, polyoxyethylenealkyl sulfate salts and the like; and nonionic surfactants such as polyoxyethylene alkyl ether, polyoxyethylenealkyl allyl ether, polyoxyethylene fatty acid esters, sorbitan fatty acid esters, polyoxyethylenesorbitan fatty acid esters, polyoxyethylenealkylamine, glycerin fatty acid esters, oxyethyleneoxypropylene block copolymers, and the like. Also, SURFYNOLS (Air Products & Chemicals), which is an acetylene-type polyoxyethyleneoxide surfactant is preferably used.

Moreover, amine oxide-type amphoteric surfactants such as N,N-dimethyl-N-alkylamine oxide and the like is preferable. Furthermore, surfactants described in JP-A-59-157636, pp. 37-38 and *Research Disclosure*, No. 308119 (1989) can be also used.

As the antifoaming agent, fluorine-containing compounds, silicone type compounds, and chelating agents represented by EDTA can be used, if necessary.

When the abovementioned specific azo compound is dispersed into an aqueous medium, it is preferable to disperse colored fine particles containing a dye and an oil-soluble polymer into the aqueous medium as described in JP-A-11-286637 and Japanese Patent Application Nos. 2000-78491, 2000-80259, and 2000-62370 (which correspond to JP-A-2001-240763, JP-A-2001-262039, and JP-A-2001-247788, respectively), or to disperse the dye of the invention dissolved in a high-boiling point organic solvent into the aqueous medium as described in Japanese Patent Application Nos. 2000-78454, 2000-78491, 2000-203856, and 2000-203857 (which correspond to JP-A-2001-262018, JP-A-2001-240763, JP-A-2001-335734, and JP-A-2002-80772, respectively).

As the specific method in case where the above specific azo compound is dispersed in an aqueous medium, the oil-soluble polymer to be used, the high-boiling organic solvent, the additives, and the amount thereof, those described in the above publications may be preferably used. Alternatively, the above azo dye can be dispersed in a solid state to form a fine particle state. At the time of dispersing, a dispersing agent or a surfactant can be used.

As dispersing equipment, a simple stirrer or impeller, an in-line mixer, a mill (e.g., a colloid mill, a ball mill, a sand mill, an attritor, a roller mill, or an agitator mill), an ultrasonic disperser, and a high-pressure emulsifying disperser (a high-pressure homogenizer: specifically, GORING homogenizer, MICRO-FLUIDIZER, DeBEE 2000, etc. are commercially available machines) can be employed. The details of methods of preparing the inkjet recording ink composition are described in JP-A-5-148436, JP-A-5-295312, JP-A-7-97541, JP-A-7-82515, JP-A-7-118584, JP-A-11-286637, and J Japanese Patent Application No. 2000-87539 (which corresponds to JP-A-2001-271003) in addition to the above publications. These methods can also be utilized in the preparation of the inkjet recording ink composition of the invention.

As the aqueous medium mentioned above, a mixture containing water as a main component and a water-miscible organic solvent as an optional component may be used. Examples of the water-miscible organic solvent include alcohols (e.g., methanol, ethanol, propanol, iso-propanol, butanol, isobutanol, sec-butanol, t-butanol, pentanol, hexanol, cyclohexanol, and benzylalcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether, and tetraethylene glycol monobutyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (e.g., formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone). These water-miscible organic solvents may be used as a mixture of two or more.

As the ink composition of the invention, it is preferable that the abovementioned specific azo compound is contained in an amount of 0.2 parts by mass to 10 parts by mass in 100 parts by mass of the inkjet recording ink composition. The ink composition of the invention may contain other dyes together with the azo compound mentioned above. In the case that the other dyes are used, it is preferable that the total content of the above azo compound and the other dyes falls within the above range.

The ink composition of the invention can be used not only for the formation of single-color images but also for the formation of full-color images. For the formation of full-color images, a magenta-colored ink, a cyan-colored ink, and a yellow-colored ink can be used. In addition, for adjustment of color tone, a black-colored ink may also be used.

As the applicable yellow dye, any dye can be used. Examples include aryl or heteryl azo dyes having phenols, naphthols, anilines, heterocyclic compounds such as pyrazolones and pyridones, open chain-type active methylene compounds, and the like as coupling components (hereinafter referred to as "coupler components"); azomethine dyes having open chain-type active methylene compounds and the like as coupler components; methine dyes such as benzylidene dyes and monomethine oxonol dyes; and quinone-based dyes such as naphthoquinone dyes and anthraquinone dyes. As the other dye species, quinophthalone dyes, nitro/nitroso dyes, acrydine dyes, acrydinone dyes, and the like can be enumerated.

As the applicable magenta dye, any dye can be used. Examples include aryl or heteryl azo dyes having phenols, naphthols, anilines, and the like as coupler components; azomethine dyes having pyrazolones, pyrazolotriazoles, and the like as coupler components; methine dyes such as arylidene dyes, styryl dyes, melocyanine dyes, cyanine dyes, and oxonol dyes; carbonium dyes such as diphenylmethane dyes, triphenylmethane dyes, and xanthene dyes; and quinone dyes such as naphthoquinone dyes, anthraquinone dyes, and anthrapyridone dyes; fused polycyclic dyes such as dioxazine dyes; and the like.

As the applicable cyan dye, any dye can be used. Examples include aryl or heteryl azo dyes having phenols, naphthols, anilines, and the like as coupler components; azomethine dyes having phenols, naphthols, heterocyclic compounds such as pyrrolotriazoles, and the like as coupler components; polymethine dyes such as cyanine dyes, oxonol dyes, and melocyanine dyes; carbonium dyes such as diphenylmethane dyes, triphenylmethane dyes, and xanthene dyes; phthalocyanine dyes; anthraquinone dyes; indigo/thioindigo dyes; and the like.

The above each dye may be a dye which expresses each color of yellow, magenta, and cyan when part of the chromophore dissolves. In that case, a counter cation may be an inorganic cation such as alkali metal or ammonium, or an organic cation such as pyridinium or a quaternary ammonium salt, or may be a polymer cation having the cation as part of the structure.

As the applicable black color material, carbon black dispersion in addition to dis-azo, tris-azo, and tetra-azo dyes can be enumerated.

[Inkjet Recording Method]

The following will explain the inkjet recording method.

The gist of the inkjet recording method of the invention is to form an image on an image-receiving material comprising a support having provided thereon an ink-receiving layer containing a white inorganic pigment particle using the above inkjet recording ink composition of the invention.

The support to be used in the inkjet recording method of the invention is not limited and examples thereof include chemical pulp such as LBKP and NBKP; mechanical pulp such as GP, PGW, RMP, TMP, CTMP, CMP, and CGP; used paper pulp such as DIP; synthetic paper; plastic film sheet; and the like.

If necessary, hitherto known additives such as pigments, binders, sizing agents, fixing agents, cationic agents, and paper strength-reinforcing agents may be mixed therewith. The support may be formed by using any type of machine such as a fourdrinier paper machine or a cylinder paper machine.

The thickness of the support is preferably about 10 to 250 μm, and the weight thereof is preferably 10 to 250 g/m$^2$.

The ink-receiving layer, as well as the back coat layer as needed, may be provided onto the support. These layers may be provided directly or the ink-receiving layer and back coat layer may be provided after subjected to size pressing or coating of an anchor coat layer using starch, polyvinyl alcohol or the like. The support may be subjected to flattening processing by a calendar device such as a machine calendar, a TG calendar, a soft calendar or the like.

As the support, papers or plastic films, the both surfaces of which are laminated with a polyolefin (e.g., polyethylene, polystyrene, polyethyleneterephthalate, polybutene, and copolymers thereof), and plastic film are more preferably employed in the invention. It is preferable to include in the polyolefin a white pigment (e.g., titanium oxide or zinc oxide) or a tinting dye (e.g., cobalt blue, ultramarine blue, or neodymium oxide).

The ink-receiving layer to be provided on the support contains a pigment and an aqueous binder. As the pigment, a white pigment is preferable. Examples of the white pigment include white inorganic pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, and zinc carbonate; and organic pigments such as styrene-based pigments, acrylic pigments, urea resins, and melamine resins.

As the white pigment contained in the ink-receiving layer, porous inorganic pigments are preferable, and particularly, synthetic amorphous silica having a large pore area is particularly preferable. As the synthetic amorphous silica, any of silicic anhydride obtained by the dry production process and hydrated silicic acid obtained by the wet production process can be used, and particularly, the hydrated silicic acid is desirably used.

Examples of the aqueous binder to be contained in the ink-receiving layer include water soluble polymers such as polyvinyl alcohol, silanol-modified polyvinyl alcohol, starch, cationic starch, casein, gelatin, carboxymethyl cellulose, hydroxyethyl cellulose, polyvinylpyrrolidone, polyalkylene oxide, polyalkylene oxide derivatives and the like; water-dispersible polymers such as styrene-butadiene latex, acrylic emulsions, and the like; and the like.

The aqueous binder may be used singly, or two or more types may be used in combination. Among them, polyvinyl alcohol and silanol-modified polyvinyl alcohol are suitable from the standpoints of adhesion to the pigment and peeling resistance of the ink-receiving layer.

The ink-receiving layer may contains a mordant, a water-proofing agent, a light-resistance enhancing agent, a surfactant, and other additives in addition to the pigment and the aqueous binder.

The mordant to be added into the ink-receiving layer is preferably immobilized, and hence, a polymer mordant is preferably used.

The polymer mordants are described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236, and U.S. Pat. Nos. 2,484,430, 2,548,564, 3,148,061, 3,309,690, 4,115,124, 4,124,386, 4,193,800, 4,273,853, 4,282,305, and 4,450,224.

The image-receiving materials containing the polymer mordant described on pages 212 to 215 of JP-A-1-161236 are particularly preferred. When the polymer mordant described in this patent is used, not only images having an excellent image quality are obtained, but also light-resistance of the images is improved.

The above water-proofing agent is effective for making the images waterproof. A cationic resin is particularly preferable as the water-proofing agent. Examples of the cationic resin include polyamidepolyamine epichlorohydrin, polyethyleneimine, polyaminesulfone, dimethyldiallyl ammonium chloride polymer, cationic polyacrylamide, colloidal silica, and the like. Among these cationic resins, polyamidepolyamine epichlorohydrin is particularly suitable. The content of the cationic resin is preferably from 1 to 15% by mass, and particularly preferably 3 to 10% by mass, based on the total solid mass of the ink-receiving layer.

Examples of the light-resistance enhancing agent include zinc sulfate, zinc oxide, hindered amine-based antioxidants, benzotriazole-based ultraviolet absorbers such as benzophenone. Of these, zinc sulfate is particularly suitable.

The abovementioned surfactant functions as a coating aid, a peeling improving agent, a slippage improving agent, or an antistatic agent. Examples of the surfactants are described in JP-A-62-173463 and JP-A-62-183457. An organofluorine compound may be used instead of the surfactant. Preferably, the organofluorine compound is hydrophobic. Examples of the organofluorine compound include fluorine-based surfactants, oily fluorine-based compounds (e.g., fluorocarbon oil), and solid fluorine-based compound resins (e.g., tetrafluoroethylene resin). The organofluorine compounds are described in JP-B-57-9053 (columns 8 to 17), and JP-A-61-20994 and JP-A-62-135826.

Examples of other additives to be added to the ink-receiving layer include a pigment dispersing agent, a thickener, an antifoaming agent, a dye, a fluorescent brightener, an antiseptics, a pH regulator, a matting agent, a film hardener, and the like. The ink-receiving layer may be composed of one layer or two layers.

In the method of the invention, as mentioned above, a back coat layer is provided on the support, if necessary. To the layer may be also added various components.

As the usable components, a white pigment, an aqueous binder, and other components are enumerated. Examples of the white pigment to be added to the back coat layer include white inorganic pigments such as precipitated calcium carbonate light, calcium carbonate heavy, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudoboehmite, aluminum hydroxide, alumina, lithopone, zeolite, hydrated halloysite, magnesium carbonate, magnesium hydroxide, and the like; and organic pigments such as styrene-based plastic pigments, acrylic plastic pigments, polyethylene, microcapsules, urea resins, melamine resins and the like.

Examples of the aqueous binder include water soluble polymers such as a styrene/maleic acid salt copolymer, a styrene/acrylic acid salt copolymer, polyvinyl alcohol, silanol-modified polyvinyl alcohol, starch, cationic starch, casein, gelatin, carboxymethyl cellulose, hydroxyethyl cellulose, and polyvinylpyrrolidone; water dispersible-polymers such as styrene-butadiene latex, and acrylic emulsion; and the like. Examples of the other components to be contained in the back coat layer include an antifoaming agent, a foaming inhibitor, a dye, a fluorescent brightener, an antiseptic, a waterproofing agent, and the like.

A polymer latex may be added to the image-receiving material (inclusive of the back coat layer, if necessary). The polymer latex is used for the purpose of imparting glossiness or water resistance, improving weather resistance, and improving the film properties such as dimensional stability, prevention of curling, prevention of adhesion, and prevention of film cracks.

The timing of the addition of the polymer latex to the image-receiving material may be before or after the addition of a colorant, or at the same time of the addition. Therefore, the place to which the latex is added may be in the image-receiving paper or in the ink, or the latex may be used as a liquid of the polymer latex alone.

When a polymer latex having a low glass transition temperature (40° C. or lower) is added into the layer containing a mordant, cracking and curling of the layer can be prevented. Furthermore, when a polymer latex having a high glass transition temperature is added into the back coating layer, curling of the layer can be also prevented.

Specifically, methods disclosed in JP-A-62-245258, JP-A-62-1316648 and JP-A-62-110066 and Japanese Patent Application Nos. 2000-363090, 2000-315231, 2000-354380, 2000-343944, 2000-268952, 2000-299465, and 2000-297365 (which correspond to JP-A-2002-166638, JP-A-2002-121440, JP-A-2002-154201, JP-A-2002-144696, JP-A-2002-80759, JP-A-2002-187342, and JP-A-2002-172774, respectively) can be preferably used.

In the method of the invention, as the image-receiving material comprising the abovementioned support and the ink-receiving layer, known image-receiving materials can be employed.

That is, plain paper, resin-coated paper, paper specialized for inkjet recording as described in, for example, JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597 and JP-A-10-337947, film, electrophotographic shared paper, cloth, glass, metal, ceramics, and the like may be enumerated.

The inkjet recording method of the invention comprises forming an image on an image-receiving material by providing energy to the abovementioned inkjet recording ink composition. The inkjet recording mode is not limited, and use can be suitably made of any of known modes, for example, a charge control mode of discharging the ink utilizing an electrostatic attracting force; a drop on demand mode (pressure pulse mode) of utilizing an oscillation pressure of piezoelectric elements; an acoustic ink jet mode of converting electric signals into acoustic beams, irradiating the ink with the beams, and discharging the ink utilizing the resulting radiation pressure; a thermal ink jet mode of heating the ink to form air bubbles and utilizing the generated pressure; and the like.

The inkjet recording mode includes a mode of injecting many drops of an ink having a low density, called a photo-ink, in small volumes; a method of improving image quality using a plurality of inks having substantially the same hue and a different density; and a mode of utilizing a colorless, transparent ink.

The following will describe the invention specifically with reference to Examples, but it should not be construed that the invention is limited thereto.

EXAMPLE 1

(Preparation of Aqueous Ink)

Deionized water was added to the following components to made the volume 1 liter, and then the whole was stirred under heating at 30 to 40° C. for 1 hour. Thereafter, the mixture was adjusted to pH 9 with 10 mol/l LiOH and filtered under reduced pressure through a microfilter having an average pore size of 0.25 µm to prepare a dye ink liquid.

Composition of Ink Liquid A

| | |
|---|---|
| A dye of the invention (a-1) | 25 g |
| Diethylene glycol | 20 g |
| Glycerin | 120 g |
| Diethylene glycol monobutyl ether | 230 g |
| 2-Pyrrolidone | 80 g |
| Triethanolamine | 17.9 g |
| Benzotriazole | 0.06 g |
| Surfinol TG | 8.5 g |
| PROXEL XL2 | 1.8 g |

Ink liquids B to F for comparison were prepared in a similar manner to the preparation of the ink liquid A with the exception that the above dye was changed as shown in the following Table 8. In this connection, the numbers of the compound examples used as the dyes mean the numbers attached for the azo compounds shown as specific examples in the above, and the comparative dyes are compounds having the following structural formulae.

(Image Recording and Evaluation)

An image was recorded on photo glossy paper (PM photo paper <glossy> (KA420PSK), manufactured by Seiko Epson Corporation) using each of the ink liquids A to F and an inkjet printer (PM-700C, manufactured by Seiko Epson Corporation), and "Paper dependency", "Light resistance", "Ozone gas resistance", and "Bleeding property" were evaluated on the obtained each image in accordance with the following methods.

<Paper Dependence>

The color tone of the image recorded on the above photo glossy paper and that of an image separately recorded on plain paper for PPC were compared. Each ink was evaluated on two grades, that is, ink exhibiting a small difference between the two was evaluated as A (good), and ink exhibiting a large difference between the two was evaluated as B (bad).

<Light Resistance>

The above photo glossy paper having an image formed thereon was irradiated with a xenon light (85,000 lx) using a weatherometer (ATLAS C. I65) for 7 days, and the image density before and after the irradiation with a xenon light was measured using a reflection densitometer (X-Rite 310TR) and evaluated as a dye retention rate. Incidentally, the above reflection density was measured at three points of 1, 1.5, and 2.0.

Each ink was evaluated on three grades, that is, ink having a dye retention rate of 70% or more at any density was ranked as A, ink having a dye retention rate of less than 70% at one or two points was ranked as B, and ink having a dye retention rate of less than 70% at all the densities was ranked as C.

<Ozone Gas Resistance>

The above photo glossy paper having an image formed thereon was allowed to stand in a dark box at room temperature under an ozone gas concentration of 0.5 ppm for 7 days and the image density before and after the standing under ozone gas was measured using a reflection densitometer (X-Rite 310TR) and evaluated as a dye retention rate. Incidentally, the above reflection density was measured at three points of 1, 1.5, and 2.0. The concentration of ozone gas in the box was set using an ozone gas monitor (Model: OZG-EM-01) manufactured by APPLICS.

Each ink was evaluated on three grades, that is, ink having a dye retention rate of 70% or more at any density was ranked as A, ink having a dye retention rate of less than 70% at one or two points was ranked as B, and ink having a dye retention rate of less than 70% at all the densities was ranked as C.

<Bleeding Property>

The above photo glossy paper having an image formed thereon was stored under conditions of 25° C. and 90% RH for 3 days and the bleeding before and after the storage was visually evaluated. Each ink was evaluated on three grades, that is, ink exhibiting no bleeding was ranked as A, ink exhibiting slight bleeding was ranked as B, and ink exhibiting much bleeding was ranked as C.

TABLE 8

| Ink | Dye | Paper depen- dency | Water resis- tance | Light resis- tance | Dark heat storability | Ozone resis- tance | Bleed- ing |
|---|---|---|---|---|---|---|---|
| A | a-1 | A | A | A | A | A | A |
| B | c-7 | A | A | A | A | A | A |
| C | e-2 | A | A | A | A | A | A |
| D | i-1 | A | A | A | A | A | A |
| E | Comparative dye 1 | A | A | B | A | C | C |
| F | Comparative dye 2 | A | A | B | A | C | C |

(Oxidation Potential of Dye)

The oxidation potential of each dye used in Examples and Comparative Examples was determined by the following method.

A value was measured in N,N-dimethylformamide containing 0.1 mol·dm$^{-3}$ of tetrapropylammonium perchlorate as a supporting electrolyte (dye concentration: 1×10$^{-3}$ mol·dm$^{-3}$) by direct current polarography using a graphite electrode and POLAROGRAPHIC ANALYZER P-100. The results of the measurement are shown in the following Table 9.

TABLE 9

| Ink | Dye | Oxidation potential | |
|---|---|---|---|
| A | a-1 | 1.42 | Invention |
| C | e-2 | 1.30 | Invention |
| E | Comparative dye 1 | 0.69 | Comparative Example |
| F | Comparative dye 2 | 0.71 | Comparative Example |

The comparative dyes given in Table 8 are as follows.

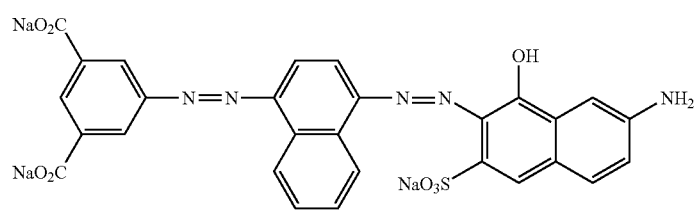

Comparative Dye 1

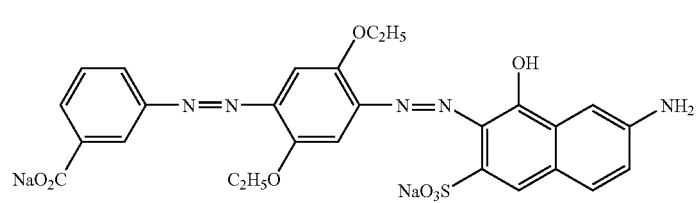

Comparative Dye 2

As shown in Table 8, it is apparent that the images obtained by using the ink liquids of the invention are more excellent in lightfastness and ozone gas resistance as compared with the images obtained from the comparative ink liquids E and F.

Furthermore, images were recorded on superfine specialized glossy paper (MJA4S3P, manufactured by Seiko Epson Corporation) by means of an inkjet printer (PM-700C, manufactured by Seiko Epson Corporation) using the ink liquids A to F. Upon the evaluation of hue, lightfastness, and ozone gas resistance of the obtained images, results similar to those in Table 8 were obtained in all cases.

While the invention has been described in detail and with reference to specific embodiments thereof, it will be apparent to one skilled in the art that various changes and modifications can be made therein without departing from the spirit and scope thereof.

This application is based on Japanese patent applications No. 2002-113460 filed on Apr. 16, 2002, and No. 2002-281723 filed on Sep. 26, 2002, the entire contents thereof being hereby incorporated by reference.

INDUSTRIAL APPLICABILITY

Since the coloring composition of the invention uses a novel azo compound having an excellent water resistance and a sufficient fastness to light, heat, humidity, and active gases in the environment as a black dye, colored images excellent in water resistance and fastness are obtained and hence, the coloring composition is suitably used as a printing ink composition, e.g., an inkjet recording ink composition.

Moreover, by the inkjet recording ink composition of the invention and the inkjet recording method using the composition, it is possible to form images having an excellent water resistance and a high fastness to light and active gases in the environment, particularly ozone gas.

The invention claimed is:

1. A coloring composition comprising a dis-azo compound or poly-azo compound which contains two or more substituents having a pKa value in water of −10 to 5 and which has an oxidation potential more positive than 0.8 V (vs SCE), wherein the dis-azo compound or poly-azo compound is an azo compound represented by the following general formula (I):

A—N=N—B—N=N—C    (I)

wherein A, B, and C each independently represents an aromatic group which may be substituted or a heterocyclic group which may be substituted, A and C are monovalent groups and B is a divalent aromatic heterocyclic group directly bonded to the azo-nitrogen atoms.

2. The coloring composition according to claim 1, wherein the dis-azo compound or poly-azo compound is an azo compound represented by the following general formula (II):

A—N=N—B—N=N-Het    (II)

wherein A and B are the same as A and B in the general formula (I) respectively, and Het represents an aromatic heterocyclic group.

3. The coloring composition according to claim 2, wherein at least one of A and B in the general formula (II) is an aromatic heterocyclic group.

4. The coloring composition according to claim 2, wherein Het in the general formula (II) is an aromatic nitrogen-containing six-membered heterocyclic group.

5. The coloring composition according to claim 2, wherein the dis-azo compound or poly-azo compound is an azo compound represented by the following general formula (III):

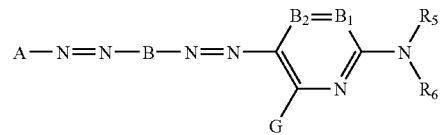

wherein A and B are the same as A and B in the general formula (II) respectively, $B_1$ and $B_2$ represent =$CR_1$— and —$CR_2$= respectively, or either one represents a nitrogen atom and the other represents =$CR_1$— or —$CR_2$=; G, $R_1$ and $R_2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an anilino group and a heterocyclic amino group), an acylamino group, a ureido group, a sulfamoylamino group, an alkoxycarbonylamino group, an aryloxycarbonylamino group, an alkyl- or arylsulfonylamino group, a heterocyclic sulfonylamino group, a nitro group, an alkyl- or arylthio group, a heterocyclic thio group, an alkyl- or arylsulfonyl group, a heterocyclic sulfonyl group, an alkyl- or arylsulfinyl group, a heterocyclic sulfinyl group, a sulfamoyl group, or a sulfo group, and each of these groups may further be substituted; $R_5$ and $R_6$ each independently represents a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group, or a sulfamoyl group, and each of these groups may further be substituted, provided that $R_5$ and $R_6$ are not hydrogen atoms at the same time; and $R_1$ and $R_5$ or $R_5$ and $R_6$ may be combined to form a five-membered or six-membered ring.

6. The coloring composition according to claim 5, wherein the dis-azo compound or poly-azo compound is an azo compound represented by the following general formula (IV):

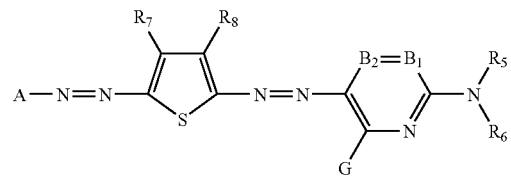

wherein A, $B_1$, $B_2$, G, $R_5$ and $R_6$ are the same as A, $B_1$, $B_2$, G, $R_5$ and $R_6$ in the general formula (III) respectively, and $R_7$ and $R_8$ are the same as $R_1$ in the general formula (III).

7. An inkjet recording ink composition, which comprises the coloring composition according to claim 1.

8. An inkjet recording method, wherein an image is formed on an image-receiving material comprising a support having provided thereon an ink receiving layer containing a white inorganic pigment particle, using the inkjet recording ink composition according to claim 7.

9. A method for improving ozone gas-fastness of an image formed on an image-receiving material comprising a support having provided thereon an ink receiving layer containing a white inorganic pigment particle using an inkjet recording ink composition, wherein the inkjet recording ink composition is the inkjet recording ink composition according to claim 7.

10. An inkjet recording ink composition, which comprises the coloring composition according to claim 2.

11. An inkjet recording ink composition, which comprises the coloring composition according to claim 3.

12. An inkjet recording ink composition, which comprises the coloring composition according to claim 4.

13. An inkjet recording ink composition, which comprises the coloring composition according to claim 4.

14. An inkjet recording ink composition, which comprises the coloring composition according to claim 6.

15. The coloring composition according to claim 1, wherein the heterocyclic group of B is selected from the group consisting of a thiophene ring, a thiazole ring, an imidazole ring, a benzothiazole ring and a thienothiazole ring.

* * * * *